United States Patent
Kashiwagi et al.

(10) Patent No.: US 8,446,958 B2
(45) Date of Patent: May 21, 2013

(54) IMAGE CODING APPARATUS, IMAGE DECODING APPARATUS, IMAGE CODING METHOD, AND IMAGE DECODING METHOD

(75) Inventors: Yoshiichiro Kashiwagi, Kyoto (JP); Tao Chen, La Canada Flintridge, CA (US); Takahiro Nishi, Nara (JP)

(73) Assignee: Panasonic Corporation, Osaka (JP)

( * ) Notice: Subject to any disclaimer, the term of this patent is extended or adjusted under 35 U.S.C. 154(b) by 37 days.

(21) Appl. No.: 13/130,286

(22) PCT Filed: Sep. 21, 2010

(86) PCT No.: PCT/US2010/049699
§ 371 (c)(1),
(2), (4) Date: May 19, 2011

(87) PCT Pub. No.: WO2011/037933
PCT Pub. Date: Mar. 31, 2011

(65) Prior Publication Data
US 2011/0222605 A1 Sep. 15, 2011

Related U.S. Application Data

(60) Provisional application No. 61/244,729, filed on Sep. 22, 2009.

(51) Int. Cl.
*H04B 1/66* (2006.01)
*G06K 9/36* (2006.01)

(52) U.S. Cl.
USPC ...................... 375/240.16; 382/232

(58) Field of Classification Search
USPC ....................... 375/240.01–240.29
See application file for complete search history.

(56) References Cited

U.S. PATENT DOCUMENTS

2005/0259729 A1* 11/2005 Sun ............................ 375/240.1
2006/0209961 A1    9/2006 Han et al.
(Continued)

FOREIGN PATENT DOCUMENTS
WO    2008/049271    5/2008

OTHER PUBLICATIONS

Segall et al., "Spatial Scalability Within the H.264/AVC Scalable Video Coding Extension", IEEE Transactions on Circuits and Systems for Video Technology, vol. 17, No. 9, Sep. 2007, 15 pages, see pp. 1125-1126.
Winken et al., "Bit-Depth Scalable Video Coding", Fraunhofer Institute for Telecommunications, Berlin Germany, Jan. 2007, 4 pages, see pp. I-5, I-6, I-8.

(Continued)

*Primary Examiner* — Behrooz Senfi

(57) ABSTRACT

An image coding apparatus using an encoder which places restrictions on the bit depth to codes a current image to be coded having a bit depth greater than a predetermined bit depth, and includes: a down-converter (102) which down-converts the current image into a base view image having a bit depth equal to or less than the predetermined bit depth; an MVC (multiview video coding) encoder (101) which codes the base view image and decodes the coded base view image to generate a reconstructed image; and a subtracter (103) which calculates differences between characteristics of pixel values of the pre-down-conversion current image and characteristics of the corresponding pixel values of the reconstructed image, and generates, using the calculated differences, a non-base view image having a bit depth equal to or less than the predetermined bit depth, wherein the MVC encoder (101) further codes the non-base view image.

22 Claims, 20 Drawing Sheets

U.S. PATENT DOCUMENTS

| | | | |
|---|---|---|---|
| 2007/0195879 A1* | 8/2007 | Jeon et al. | 375/240.1 |
| 2007/0269104 A1 | 11/2007 | Whitehead et al. | |
| 2009/0003457 A1 | 1/2009 | Liu et al. | |
| 2009/0015662 A1 | 1/2009 | Kim et al. | |
| 2009/0097573 A1* | 4/2009 | Choi et al. | 375/240.26 |
| 2009/0116558 A1 | 5/2009 | Chen et al. | |
| 2009/0238279 A1* | 9/2009 | Tu et al. | 375/240.16 |
| 2009/0290641 A1* | 11/2009 | Crinon et al. | 375/240.16 |
| 2010/0111167 A1* | 5/2010 | Wu et al. | 375/240.12 |
| 2010/0266042 A1* | 10/2010 | Koo et al. | 375/240.16 |
| 2012/0314965 A1* | 12/2012 | Kashiwagi et al. | 382/232 |

OTHER PUBLICATIONS

Segall et al., "Spatial Scalability Within the H.264/AVC Scalable Video Coding Extension", IEEE Transactions on Circuits and Systems for Video Technology, vol. 7, No. 9, Sep. 2007, 15 pages, see pp. 1125-1126.

Vetro, Anthony, "H.264/AVC and Its Extensions: How Close is this Family?", Mitsubishi Electric Research Labs, Cambridge, USA, 61 pages, see pp. 33, 38.

* cited by examiner

IMAGE CODING APPARATUS, IMAGE DECODING APPARATUS, IMAGE CODING METHOD, AND IMAGE DECODING METHOD

CROSS-REFERENCE TO RELATED APPLICATION

This application claims the benefit of U.S. Patent provisional application No. 61/244,729, filed on Sep. 22, 2009. The disclosure of the above application is incorporated herein by reference.

TECHNICAL FIELD

The present invention relates to image coding apparatuses which code images having a great bit depth, and image decoding apparatuses which decode coded images having a great bit depth.

BACKGROUND ART

Conventionally, image processing apparatuses such as display devices, imaging devices, image coding apparatuses, and image decoding apparatuses process images in units of a pixel. Each pixel includes three individual sub-pixels of green, red, and blue (RGB). A display device mixes colors of pixels by controlling the intensity of each sub-pixel. The number of intensity levels is varied for each sub-pixel. This variation in the number of levels depends on the bit depth of each sub-pixel color.

A bit depth indicates information capacity per pixel, and specifically indicates the number of bits per sub-pixel. For example, a pixel with an 8-bit depth enables representation at 256 (2 to the 8th power) intensity levels for each of its sub-pixels. As another example, a pixel with a 10-bit depth enables representation at 1024 (2 to the 10th power) intensity levels for each of its sub-pixels.

The number of combinations of intensity levels for the three sub-pixels in each pixel with an 8-bit depth is 256 to the 3rd power (16,777,216). Whereas the number of combinations of intensity levels for the three sub-pixels in each pixel with a 10-bit depth is 1024 to the 3rd power (1,073,741,824). Accordingly, the number of colors reproducible using pixels with a 10-bit depth is 64 times higher than the number of colors reproducible using pixels having an 8-bit depth.

Recently, display devices for professional use can represent images having a 12-bit depth or a 16-bit depth. Some of display devices for consumer use can represent images having a more than 8-bit depth.

Display devices capable of reproducing a greater number of colors can provide smoother transitions from color to color and a more realistic representation of real-life colors. Stated differently, a deeper bit depth yields smoother transitions from color to color and a more realistic representation of real-life colors. For this reason, consumers would prefer images having a 10-bit depth to images having an 8-bit depth as images to be represented. Methods of representing images having a greater bit depth include a method disclosed in Patent Literature (PTL) 1.

An image represented with an 8-bit depth is called an 8-bit image. Likewise, an image represented with a 10-bit depth is called a 10-bit image.

CITATION LIST

Patent Literature

[PTL 1]
PCT International Application Publication No. WO2008/049271

SUMMARY OF INVENTION

Technical Problem

However, not all video applications can handle images having a more than 8-bit depth. Even Blu-ray applications that achieve the highest image quality cannot handle images having a more than 8-bit depth.

A display device capable of representing 10-bit images may represent original images coded as 8-bit images. In such a case, the display device cannot provide smoother transitions from color to color and a more realistic representation of real-life colors. In this case, even when the original 8-bit images are up-converted into 10-bit images, the images resulting from the up-conversion do not always provide a more realistic representation of real-life colors. For this reason, it is desirable that 10-bit original images are coded rather than that the original 8-bit images are up-converted into 10-bit images.

On the other hand, when 10-bit images are coded, display devices for representing 8-bit images cannot represent the coded 10-bit images.

The method disclosed in PTL 1 switches decoding methods depending on the environment at a client side. This enables representation of images depending on the environment at the client side. However, the method in PTL 1 is significantly different from conventional coding and decoding methods, and therefore is difficult to be implemented practically.

The present invention has been conceived in view of this, and has an object to provide image coding apparatuses which code images having a great bit depth using an encoder which places restrictions on the bit depth.

Solution to Problem

In order to solve the above-described problems, an image coding apparatus according to the present invention is intended to code a current image to be coded having a bit depth greater than a predetermined bit depth (the bit depth indicating information capacity per pixel), and the image coding apparatus includes: a down-converter which down-converts the current image into a base view image having a bit depth equal to or less than the predetermined bit depth; an MVC (multiview video coding) encoder which codes the base view image and decodes the coded base view image to generate a reconstructed image; and a subtracter which calculates differences between characteristics of pixel values of the pre-down-conversion current image and characteristics of corresponding pixel values of the reconstructed image, and generates, using the calculated differences, a non-base view image having a bit depth equal to or less than the predetermined bit depth, wherein the MVC encoder further codes the non-base view image.

In this way, it is possible to code images having a great bit depth using an encoder which places restrictions on the bit depth for each of the images.

In addition, the down-converter may down-convert the current image into the base view image by shifting down each of pixel values of the current image, and the subtracter may shift up each of pixel values of the reconstructed image such that the reconstructed image and the pre-down-conversion current image have the same bit depth, calculate the differences between the respective pixel values of the pre-down-conversion current image and the corresponding shifted-up pixel values of the reconstructed image, and generate, using the calculated differences, the non-base view image.

In this way, it is possible to reduce change in the characteristics of a current image to be down-converted. Furthermore, this makes it possible to obtain an accurate difference between the characteristics of the current image to be down-converted and the characteristics of a reconstructed image. Furthermore, shift operation enables high-speed processing.

In addition, the down-converter may down-convert the current image into the base view image by dividing each of pixel values of the current image by a predetermined divisor, and the subtracter may multiply each of pixel values of the reconstructed image by a predetermined multiplier such that the reconstructed image and the pre-down-conversion current image have the same bit depth, calculate the differences between the respective pixel values of the pre-down-conversion current image and the corresponding post-multiplication pixel values of the reconstructed image, and generate, using the calculated differences, the non-base view image.

In this way, it is possible to reduce change in the characteristics of a current image to be down-converted. Furthermore, it is possible to obtain accurate differences between the characteristics of the current image to be down-converted and the characteristics of a reconstructed image.

In addition, the subtracter may generate the non-base view image by adding, to each of the differences, a predetermined value for making the corresponding one of the pixel values of the non-base view image into a positive value.

In this way, pixel values resulting from the differences between the characteristics of the current image to be down-converted and the characteristics of the reconstructed image are adjusted to accurate pixel values.

In addition, the subtracter may generate the non-base view image by adding, to each of the differences, a value obtained by rounding, to an integer, a half of a maximum pixel value represented by the bit depth of the non-base view image.

In this way, the pixel values resulting from the differences are adjusted to the median value of a possible range for the pixel values when no quantization distortion is included. Accordingly, the pixel values resulting from the differences are adjusted to fall within the possible range for the pixel values even when quantization distortion is included.

In addition, the MVC encoder may obtain a motion vector by performing motion estimation on the base view image, code the base view image by performing motion prediction using the obtained motion vector, and code the non-base view image by performing motion prediction using the motion vector used to code the base view image.

This makes it possible to reduce unnecessary processing involved in motion estimation. Thereby, the processing speed is increased.

In addition, the MVC encoder: may obtain a first motion vector by performing motion estimation on the base view image, and code the base view image by performing motion prediction using the obtained first motion vector; and may obtain a second motion vector by performing motion estimation on the non-base view image within a 1-pixel range in both a horizontal direction and a vertical direction from an integer pixel position co-located with an integer pixel position shown by an integer portion of the first motion vector used to code the base view image, and code the non-base view image by performing motion prediction using the obtained second motion vector.

This makes it possible to reduce the amount of information to be processed. Furthermore, limiting the motion estimation range reduces unnecessary processing. Thereby, the processing speed is increased. Furthermore, motion estimation within the limited range reduces decrease in the motion prediction accuracy.

In addition, the MVC encoder: may obtain a first motion vector by performing motion estimation on a motion estimation range in the base view image, code the base view image by performing motion prediction using the obtained first motion vector, quantize the obtained first motion vector, and inversely quantize the quantized first motion vector; and may obtain a second motion vector by performing motion estimation on the non-base view image within a range that includes a pixel position shown by the inversely quantized first motion vector and is smaller than the motion estimation range in the base view image, and code the non-base view image by performing motion prediction using the obtained second motion vector.

This reduces the amount of information to be processed, thereby reducing unnecessary processing. Furthermore, this makes it possible to adjust the motion prediction accuracy and processing speeds depending on the quantization levels and motion estimation ranges.

In addition, the MVC encoder may code the non-base view image by using inter-view prediction that assumes that a magnitude of a displacement vector to be used for inter-view prediction is 0.

This makes it possible to reduce unnecessary processing involved in displacement estimation. Thereby, the processing speed is increased.

In addition, the MVC encoder may obtain a displacement vector to be used for inter-view prediction by performing displacement estimation within a 1-pixel range in both a horizontal direction and a vertical direction, and code the non-base view image by using inter-view prediction.

Limiting the displacement estimation range in this way reduces unnecessary processing. Thereby, the processing speed is increased. Furthermore, displacement estimation within the limited range reduces decrease in the inter-view prediction accuracy.

Furthermore, an image decoding apparatus according to the present invention may be intended to decode a current image to be decoded which is included in a bitstream and has a bit depth greater than a predetermined bit depth (the bit depth indicating information capacity per pixel), and the image decoding apparatus may include: an MVC (multiview video coding) decoder which decodes a base view image having a bit depth equal to or less than the predetermined bit depth and a non-base view image having a bit depth equal to or less than the predetermined bit depth, the base view image and the non-base view image being included in the bitstream; and an adder which synthesizes each of pixel values of the base view image and a corresponding one of pixel values of the non-base view image into the current image having the bit depth greater than the predetermined bit depth.

This makes it possible to decode images having a great bit depth using a decoder which places restrictions on the bit depth for each of the images.

In addition, the adder may generate the current image by shifting up each of the pixel values of the base view image such that the base view image and the current image have the same bit depth and adding each of the pixel values of the non-base view image to the corresponding one of the shifted-up pixel values of the base view image.

In this way, two images are synthesized appropriately into an intended image having a great bit depth. Furthermore, shift operation enables high-speed processing.

In addition, the adder may generate the current image by multiplying each of the pixel values of the base view image by a predetermined multiplier such that the base view image and the current image have the same bit depth and adding each of the pixel values of the non-base view image to the corresponding one of the post-multiplication pixel values of the base view image.

In this way, the two images are appropriately synthesized into an intended image having a great bit depth.

In addition, the adder may generate the current image by subtracting a predetermined value added in coding, from each of values obtained by adding the pixel values of the non-base view image to the corresponding post-multiplication pixel values of the base view image.

Subtracting the predetermined value added by a coding apparatus side to adjust the pixel values maintains consistency between the coding apparatus side and a decoding apparatus side.

In addition, the adder may generate the current image by subtracting a value obtained by rounding, to an integer, a half of a maximum pixel value represented by the bit depth of the non-base view image from each of values obtained by adding the pixel values of the non-base view image to the corresponding post-multiplication pixel values of the base view image.

Subtracting the value added by the coding apparatus side to adjust the quantization distortion maintains consistency between the coding apparatus side and the decoding apparatus side.

In addition, the adder may generate the current image by adjusting a value smaller than a predetermined minimum value among the values obtained by subtracting the half of the maximum pixel value to the predetermined minimum value and adjusting a value greater than a predetermined maximum value among the values obtained by subtracting the half of the maximum pixel value to the predetermined maximum value.

In this way, the generated pixel value is adjusted to a pixel value within the possible range. Thereby, a fatal error is prevented.

Furthermore, an image coding method according to the present invention may be intended to code a current image to be coded having a bit depth greater than a predetermined bit depth (the bit depth indicating information capacity per pixel), and the image coding method may include: down-converting the current image into a base view image having a bit depth equal to or less than the predetermined bit depth; coding the base view image and decoding the coded base view image to generate a reconstructed image, using an MVC (multiview video coding) encoder; calculating differences between characteristics of pixel values of the pre-down-conversion current image and characteristics of corresponding pixel values of the reconstructed image, and generating, using the calculated differences, a non-base view image having a bit depth equal to or less than the predetermined bit depth; and coding the non-base view image, using the MVC encoder.

In this way, an image coding apparatus according to the present invention is implemented as an image coding method.

Furthermore, an image decoding method according to the present invention may be intended to decode a current image to be decoded which is included in a bitstream and has a bit depth greater than a predetermined bit depth (the bit depth indicating information capacity per pixel), and the image decoding method may include: decoding a base view image having a bit depth equal to or less than the predetermined bit depth and a non-base view image having a bit depth equal to or less than the predetermined bit depth, using an MVC (multiview video coding) decoder, the base view image and the non-base view image being included in the bitstream; and synthesizing each of pixel values of the base view image and a corresponding one of pixel values of the non-base view image into the current image having the bit depth greater than the predetermined bit depth.

In this way, an image decoding apparatus according to the present invention is implemented as an image decoding method.

Furthermore, an integrated circuit according to the present invention may be intended to code a current image to be coded having a bit depth greater than a predetermined bit depth (the bit depth indicating information capacity per pixel), and the integrated circuit may include: a down-converter which down-converts the current image into a base view image having a bit depth equal to or less than the predetermined bit depth; an MVC (multiview video coding) encoder which codes the base view image and decodes the coded base view image to generate a reconstructed image; and a subtracter which calculates differences between characteristics of pixel values of the pre-down-conversion current image and characteristics of corresponding pixel values of the reconstructed image, and generates, using the calculated differences, a non-base view image having a bit depth equal to or less than the predetermined bit depth, wherein the MVC encoder further codes the non-base view image.

In this way, an image coding apparatus according to the present invention is implemented as an integrated circuit.

Furthermore, an integrated circuit according to the present invention may be intended to decode a current image to be decoded which is included in a bitstream and has a bit depth greater than a predetermined bit depth (the bit depth indicating information capacity per pixel), and the integrated circuit may include: an MVC (multiview video coding) decoder which decodes a base view image having a bit depth equal to or less than the predetermined bit depth and a non-base view image having a bit depth equal to or less than the predetermined bit depth, the base view image and the non-base view image being included in the bitstream; and an adder which synthesizes each of pixel values of the base view image and a corresponding one of pixel values of the non-base view image into the current image having the bit depth greater than the predetermined bit depth.

In this way, an image decoding apparatus according to the present invention is implemented as an integrated circuit.

Furthermore, a recording medium according to the present invention may be a non-transitory computer-readable recording medium having a computer program recorded thereon for causing the computer to execute coding a current image to be coded having a bit depth greater than a predetermined bit depth (the bit depth indicating information capacity per pixel). The coding includes: down-converting the current image into a base view image having a bit depth equal to or less than the predetermined bit depth; coding the base view image and decoding the coded base view image to generate a reconstructed image, using an MVC (multiview video coding) encoder; calculating differences between characteristics of pixel values of the pre-down-conversion current image and characteristics of corresponding pixel values of the reconstructed image, and generating, using the calculated differences, a non-base view image having a bit depth equal to or less than the predetermined bit depth; and coding the non-base view image, using the MVC encoder.

In this way, the image coding method according to the present invention is implemented as a recording medium having a program recorded thereon for causing a computer to execute the image coding method.

Furthermore, a recording medium according to the present invention may be a non-transitory computer-readable recording medium having a computer program recorded thereon for causing the computer to execute decoding a current image to be decoded which is included in a bitstream and has a bit depth greater than a predetermined bit depth (the bit depth indicating information capacity per pixel). The decoding includes: decoding a base view image having a bit depth equal to or less than the predetermined bit depth and a non-base view image having a bit depth equal to or less than the predetermined bit depth, using an MVC (multiview video coding) decoder, the base view image and the non-base view image being included in the bitstream; and synthesizing each of pixel values of the base view image and a corresponding one of pixel values of the non-base view image into the current image having the bit depth greater than the predetermined bit depth.

In this way, the image decoding method according to the present invention is implemented as a recording medium having a program recorded thereon for causing a computer to execute the image decoding method.

Advantageous Effects of Invention

According to the present invention, it is possible to code images having a great bit depth using an encoder which places restrictions on the bit depth for each of the images.

BRIEF DESCRIPTION OF DRAWINGS

These and other objects, advantages and features of the invention will become apparent from the following description thereof taken in conjunction with the accompanying drawings that illustrate a specific embodiment of the invention. In the Drawings.

DESCRIPTION OF EMBODIMENTS

Embodiment 1

In the Multiview Video Coding (MVC) technique, a view of a first type is coded as a base view. Here, the base view is also called as a first view. A view of a second type is coded as a non-base view. The non-base view is also called as a dependent view or a second view.

The bitstream of a coded base view can be decoded independently. For example, the base view is used to represent a 2D version of a 3D video. On the other hand, the bitstream of a coded non-base view cannot be decoded independently. The non-base view needs to be decoded together with the corresponding base view.

The non-base view is used to enhance the base view. Using both the base view and the non-base view yields a 3D effect. For example, a combination of a base view corresponding to a left-eye video and a non-base view corresponding to a right-eye video represents a stereoscopic video.

Figure 1:
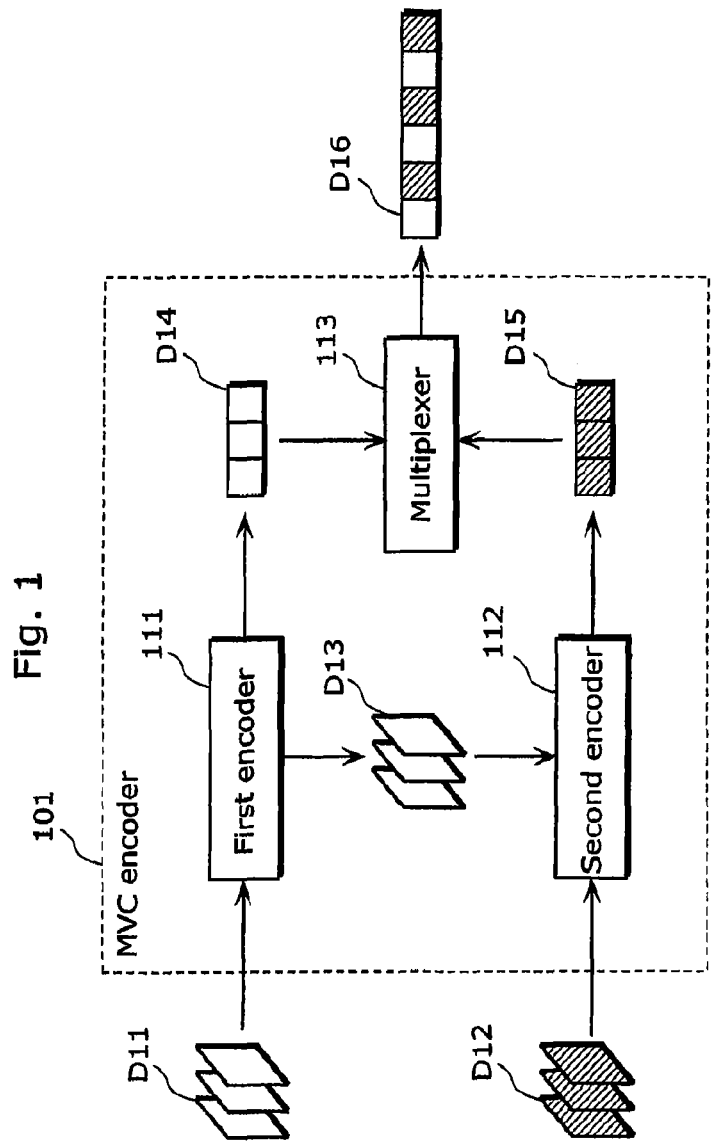
FIG. 1 is a structural diagram of an MVC encoder according to Embodiment 1.

FIG. 1 is a structural diagram of an MVC encoder according to Embodiment 1. The MVC encoder is intended to code a multiview video, based on the multiview video coding method. The MVC encoder 101 shown in FIG. 1 includes a first encoder 111, a second encoder 112, and a multiplexer 113.

The first encoder 111 receives a base view image D11 that is an image corresponding to the base view. The first encoder 111 codes the base view image D11 to generate a base view bitstream D14 that includes the coded based view image D11. Furthermore, the first encoder 111 decodes the coded base view image D11 to generate a reconstructed image D13. The reconstructed image D13 is used for inter-view prediction.

The second encoder 112 receives a non-base view image D12 that is an image corresponding to the non-base view. The second encoder 112 codes the non-base view image D12 to generate a non-base view bitstream D15 that includes the coded non-base view image D12. At this time, the second encoder 112 may code the non-base view image D12 with reference to the reconstructed image D13 using inter-view prediction. This increases the coding efficiency.

The multiplexer 113 superimposes the base view bitstream D14 and the non-base view bitstream D15 to generate an MVC bitstream D16. Typically, the multiplexer 113 generates the MVC bitstream D16 such that portions representing a base view and portions representing a non-base view appear alternately.

In this way, the MVC encoder 101 receives the base view image D11 and the non-base view image D12, and codes them to generate the MVC bitstream D16. For example, the MVC encoder 101 codes the base view image D11 that is a left-eye image and the non-base view image D12 that is a right-eye image among the 3D images, and thereby being able to output the coded 3D images as the MVC bitstream D16.

The MVC encoder 101 shown in FIG. 1 is an example. The MVC encoder 101 may include three or more encoders and code three or more views. Alternatively, a single encoder included in the MVC encoder 101 may code plural views. Alternatively, the MVC encoder 101 may separately output the base view bitstream D14 and the non-base view bitstream D15 without superimposing them. In this case, the MVC encoder 101 may not include any multiplexer 113.

Figure 2:
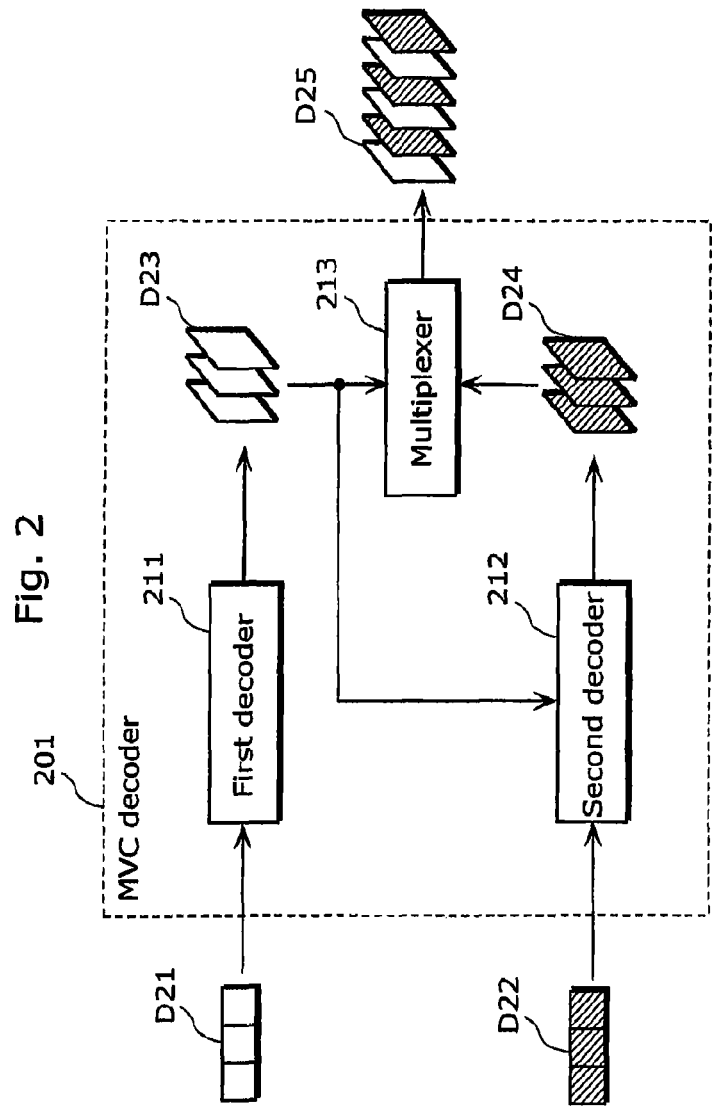
FIG. 2 is a structural diagram of an MVC decoder according to Embodiment 1.

FIG. 2 is a structural diagram of an MVC decoder according to Embodiment 1. The MVC decoder is intended to decode a multiview video coded based on the multiview video coding method. The MVC decoder 201 shown in FIG. 2 includes a first decoder 211, a second decoder 212, and a multiplexer 213.

The first decoder 211 receives a base view bitstream D21. The first decoder 211 may read, as the base view bitstream D21, portions of a base view from the MVC bitstream D16 shown in FIG. 1. The first decoder 211 decodes a base view image D23 in the base view bitstream D21.

The second decoder 212 receives a non-base view bitstream D22. The second decoder 212 may read, as the non-base view bitstream D22, the portions of a non-base view from the MVC bitstream D16 shown in FIG. 1. The second decoder 212 decodes a non-base view image D24 in the non-base view bitstream D22. At this time, the second decoder 212 may decode the non-base view image D24 with reference to the base view image D23 using inter-view prediction.

The multiplexer 213 superimposes the base view image D23 and the non-base view image D24 to generate an image sequence D25. Typically, the multiplexer 213 generates the image sequence D25 such that the portions representing a base view and the portions representing a non-base view appear alternately.

In this way, the MVC decoder 201 receives the base view bitstream D21 and the non-base view bitstream D22, and decode the base view image D23 and the non-base view image D24 to generate an image sequence D25.

For example, the MVC decoder 201 decodes the base view image D23 that is a left-eye image in the base view bitstream D21 corresponding to the left eye and the non-base view image D24 that is a right-eye image in the non-base view bitstream D22 corresponding to the right eye. The MVC decoder 201 can output, as a 3D image, the image sequence D25 generated by combining the base view bitstream D21 and the non-base view bitstream D22.

The MVC decoder 201 shown in FIG. 2 is an example as in the MVC encoder 101 shown in FIG. 1. The MVC decoder 201 may include three or more decoders and decode three or more views. Alternatively, a single decoder included in the MVC decoder 201 may decode plural views. Alternatively, the MVC decoder 201 may separately output the base view image D23 and the non-base view image D24 without superimposing them. In this case, the MVC decoder 201 may not include any multiplexer 213.

Alternatively, the MVC decoder 201 may include a demultiplexer that demultiplexes the MVC bitstream D16 shown in FIG. 1 into the portions representing a base view and the portions representing a non-base view.

The MVC encoder 101 shown in FIG. 1 and the MVC decoder 201 shown in FIG. 2 are a typical MVC encoder and a typical MVC decoder, respectively. Accordingly, the MVC encoder 101 and the MVC decoder 201 cannot respectively code and decode an image having a more than 8-bit depth. For this reason, each of the image coding apparatus and the image decoding apparatus according to Embodiment 1 includes an additional structural element.

Figure 3:
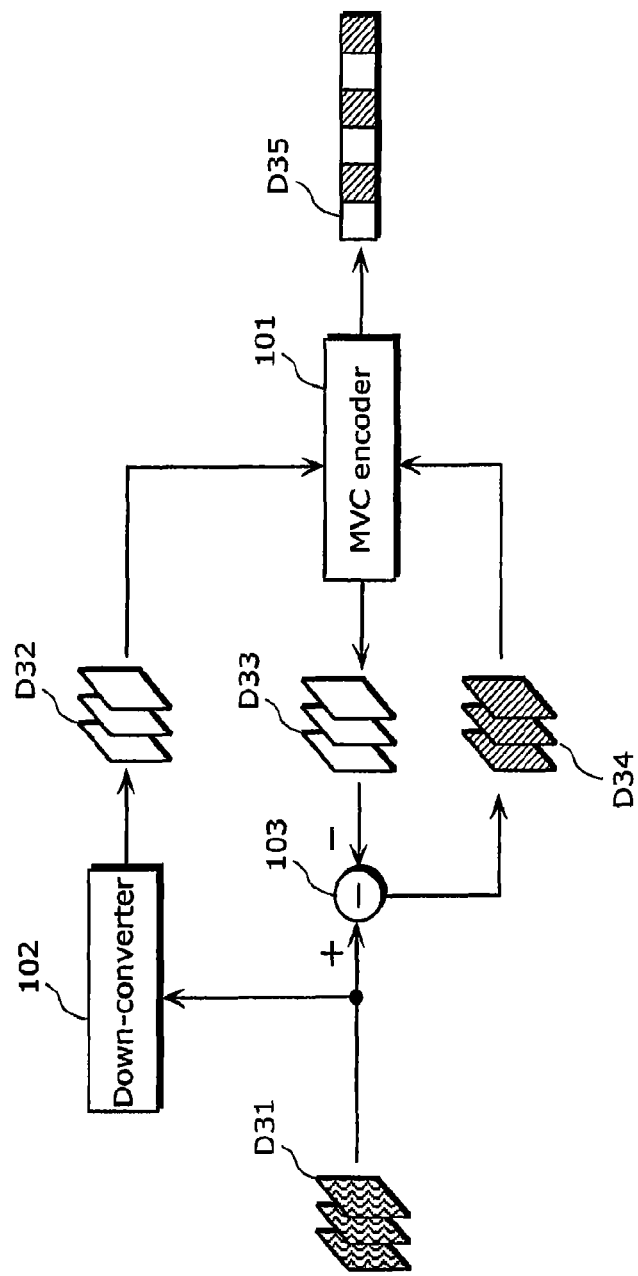
FIG. 3 is a structural diagram of an image coding apparatus according to Embodiment 1.

FIG. 3 is a structural diagram of the image coding apparatus including the MVC encoder 101 shown in FIG. 1. The image coding apparatus shown in FIG. 3 includes the MVC encoder 101, a down-converter 102, and a subtracter 103.

The down-converter 102 down-converts a current 10-bit image D31 to be coded into an 8-bit base layer image D32.

The MVC encoder 101 codes the base layer image D32 as a base view image. Furthermore, the MVC encoder 101 decodes the coded base layer image D32 to generate an 8-bit reconstructed image D33.

The subtracter 103 generates an enhancement layer image D34 for up-scaling the base layer image D32 to a 10-bit image, using the difference between the characteristics of the 10-bit image D31 and the characteristics of the reconstructed image D33. The characteristics of each image used here are information indicating the magnitudes of its pixel values, for example.

The MVC encoder 101 codes the enhancement layer image D34 as a non-base view image. Next, the MVC encoder 101 outputs the coded base layer image D32 and enhancement layer image D34 in form of an MVC bitstream D35.

Figure 4:
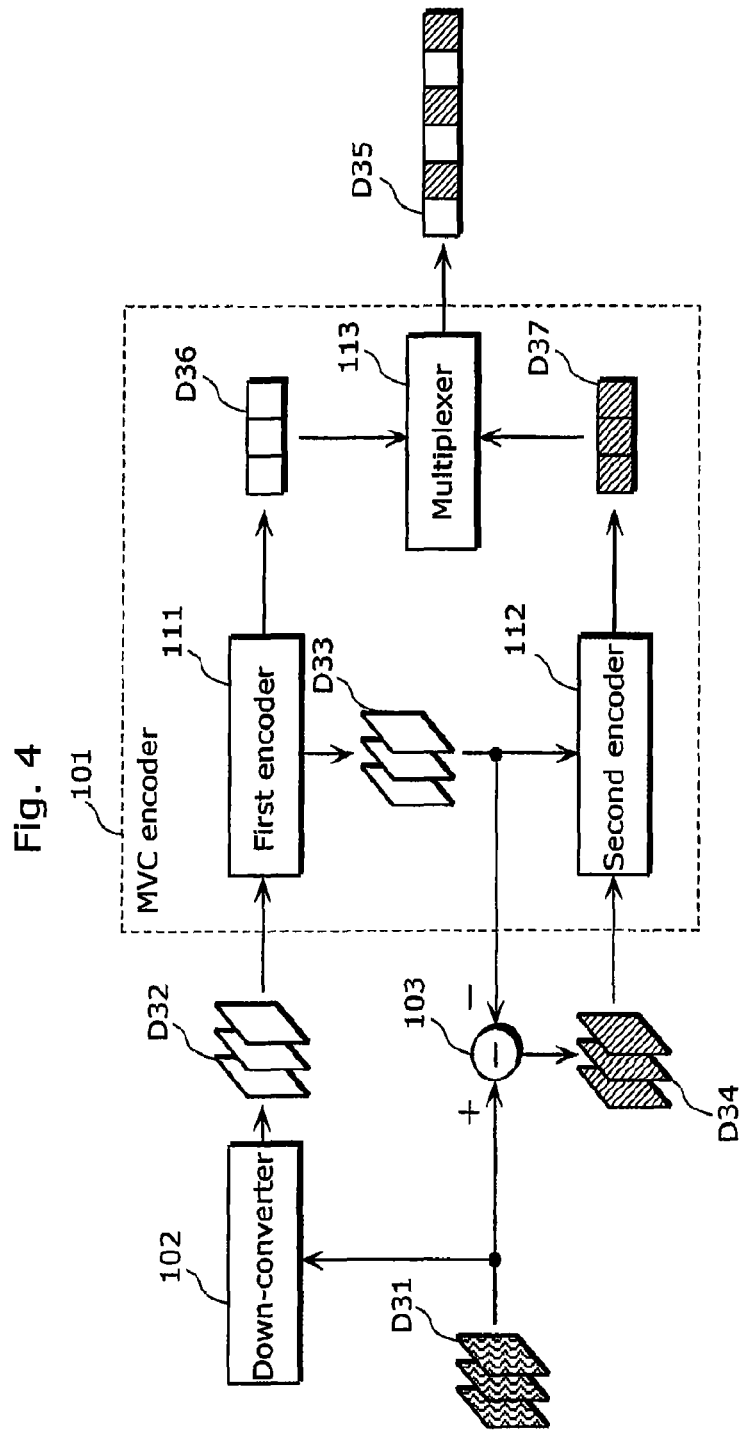
FIG. 4 is a detailed structural diagram of the image coding apparatus according to Embodiment 1.

FIG. 4 is a diagram specifically showing the image coding apparatus shown in FIG. 3. With reference to FIG. 4, the image coding apparatus according to Embodiment 1 is described in detail below.

The down-converter 102 down-converts the 10-bit image D31 into the 8-bit base layer image D32. More specifically, the down-converter 102 down-converts the 10-bit image D31 according to the operation shown by Expression 1.

$$B(x,y)=(S(x,y)+2)>>2 \quad \text{(Expression 1)}$$

Here, (x, y) shows a pixel position. B(x, y) shows the pixel value of the base layer image D32. S(x, y) shows the pixel value of the 10-bit image D31. The symbol ">>" shows a right bit-shift operation.

First, the down-converter 102 adds 2 to each of the pixel values of the 10-bit image D31. Next, the down-converter 102 shifts each pixel value to the right by 2 bits. In this way, the least significant 2 bits of each pixel value are rounded off to generate the 8-bit base layer image D32.

The first encoder 111 of the MVC encoder 101 codes the base layer image D32 as a base view image to generate a base layer bitstream D36. Furthermore, the first encoder 111 decodes the coded base layer image D32 to generate the reconstructed image D33.

The subtracter 103 generates the enhancement layer image D34, using the difference between the 10-bit image D31 and the reconstructed image D33. More specifically, the subtracter 103 calculates the difference between the 10-bit image D31 and the reconstructed image D33 according to the operation shown by Expression 2.

$$E(x,y)=S(x,y)-(Br(x,y)<<2)+128 \quad \text{(Expression 2)}$$

Here, (x, y) shows a pixel position. E(x, y) shows the pixel value of the enhancement layer image D34. S(x, y) shows the pixel value of the 10-bit image D31. Br(x, y) shows the pixel value of the reconstructed image D33. The symbol "<<" shows a left bit-shift operation.

First, the subtracter 103 shifts each pixel value of the reconstructed image D33 to the left by 2 bits. In this way, the reconstructed image D33 is converted into an image having a 10-bit depth. Next, the subtracter 103 subtracts each left-shifted pixel value from a corresponding one of the pixel values of the 10-bit image D31. Then, the subtracter 103 adds 128 to each of the subtraction results.

The subtracter 103 adds 128 to each of the subtraction results here, but the subtracter 103 may add, instead of 128, a value obtained by rounding, to an integer, a half of the maximum pixel value represented by the bit depth of the enhancement layer image D34. Alternatively, the subtracter 103 may add, to each of the subtraction results, any other value for making each of the pixel values of the enhancement layer image D34 into a positive value.

In addition to this, the subtracter 103 may clip each E(x, y) within the range [0.255] of the 8-bit image. More specifically, the subtracter 103 may convert each of the pixel values smaller than 0 to 0, and may convert each of the pixel values larger than 255 to 255.

In the case of the exemplary reconstructed image D33 including quantization distortion, the quantization distortion is assumed to be within a range of [−32, 31] at maximum, based on the range [0, 255] for the pixel values of an 8-bit image. The quantization distortion falls within the range of [−128, 127] even when it is quadrupled by a left bit-shift operation. Thus, the range for the values shown by S(x, y)−(Br(x, y)>>2 is within the range of [−128, 127].

Accordingly, even when the subtracter 103 adds 128 to each of the aforementioned differences and then clips E(x, y) within the range [0, 255] for each of the pixel values of the 8-bit image, only error values are affected thereby. Thus, the subtracter 103 can remove or conceal only fatal errors by clipping E(x, y) within the range [0, 255] for each of the pixel values of the 8-bit image.

The second encoder 112 of the MVC encoder 101 codes, as a non-base view image, the enhancement layer image D34 generated by the subtracter 103. In this way, the second encoder 112 generates an enhancement layer bitstream D37. At this time, the second encoder 112 may code the enhancement layer image D34 with reference to the reconstructed image D33 using inter-view prediction.

Here, there is little possibility that the reconstructed image D33 and the enhancement layer image D34 have a correlation. However, use of inter-view prediction is not restricted. The second encoder 112 may code the enhancement layer image D34 using inter-view prediction.

Meanwhile, the multiplexer 113 of the MVC encoder 101 superimposes the base layer bitstream D36 and the enhancement layer bitstream D37 to generate the MVC bitstream D35.

Figure 5:
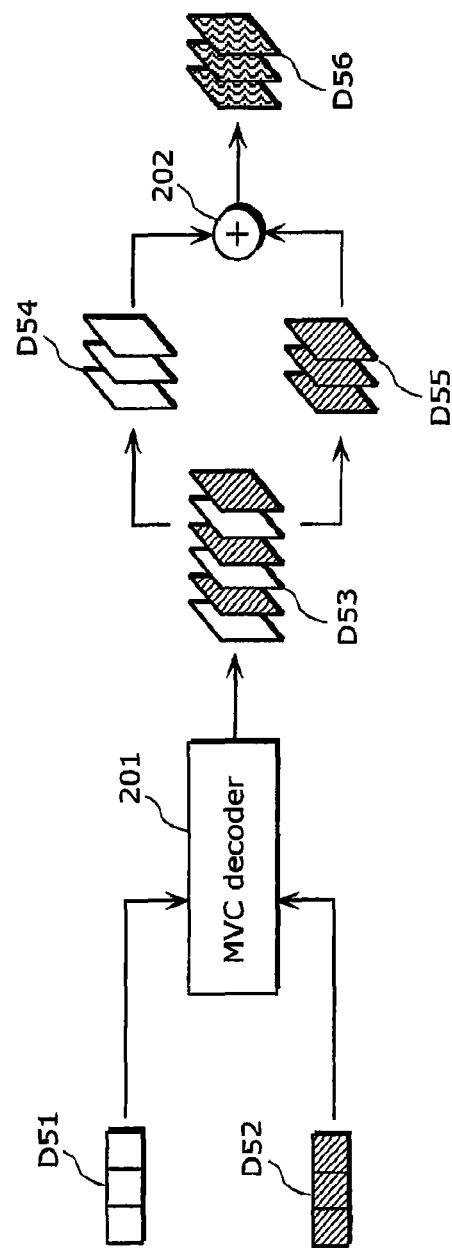
FIG. 5 is a structural diagram of an image decoding apparatus according to Embodiment 1.

FIG. 5 is a structural diagram of the image decoding apparatus including the MVC decoder 201 shown in FIG. 2. The image decoding apparatus shown in FIG. 5 includes the MVC decoder 201 and an adder 202.

The MVC decoder 201 decodes base layer images in an base layer bitstream D51. Furthermore, the MVC decoder 201 decodes enhancement layer images in an enhancement layer bitstream D52. Thereby, the MVC decoder 201 generates an image sequence D53.

The adder 202 synthesizes a base layer image D54 included in the image sequence D53 and an enhancement layer image D55 included in the image sequence D53 to generate a current 10-bit image D56 to be decoded.

Figure 6:
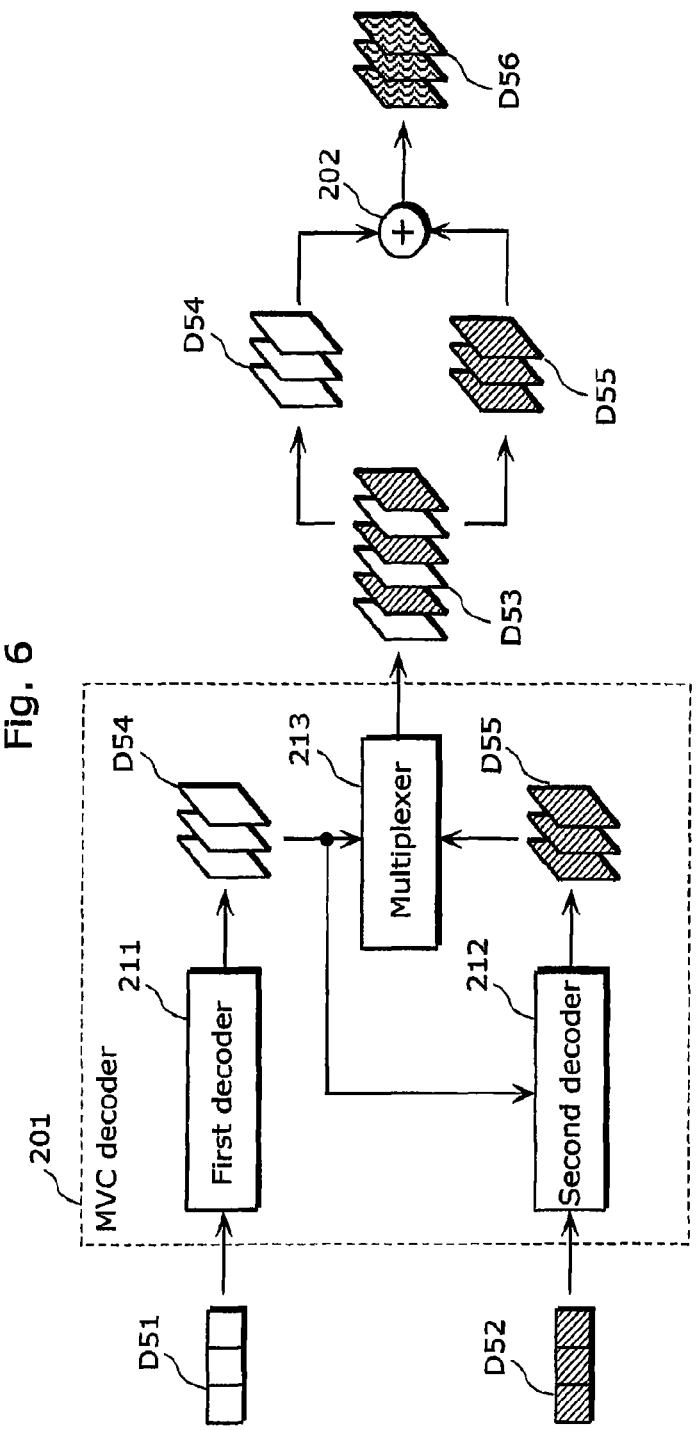
FIG. 6 is a detailed structural diagram of the image decoding apparatus according to Embodiment 1.

FIG. 6 is a diagram specifically showing the image decoding apparatus shown in FIG. 5. With reference to FIG. 6, the image decoding apparatus according to Embodiment 1 is described in detail below.

The first decoder 211 of the MVC decoder 201 decodes the base layer image D54 in the base layer bitstream D51.

Furthermore, the second decoder 212 of the MVC decoder 201 decodes the enhancement layer image D55 from the enhancement layer bitstream D52. At this time, the second decoder 212 may decode the enhancement layer image D55 with reference to the base layer image D54 using inter-view prediction.

The multiplexer 213 of the MVC decoder 201 generates the image sequence D53 using the base layer image D54 and the enhancement layer image D55.

The adder 202 synthesizes the base layer image D54 included in the image sequence D53 and the enhancement layer image D55 included in the image sequence D53 to generate the 10-bit image D56. More specifically, the adder 202 synthesizes the base layer image D54 and the enhancement layer image D55 according to the operation, shown by Expression 3.

$$V(x,y)=(Br(x,y)<<2)+(E(x,y)-128) \quad \text{(Expression 3)}$$

Here, (x, y) shows a pixel position. V(x, y) shows the pixel value of the 10-bit image D56. Br(x, y) shows the pixel value of the base layer image D54. E(x, y) shows the pixel value of the enhancement layer image D55. The symbol "<<" shows a left bit-shift operation.

First, the adder 202 shifts each pixel value of the base layer image D54 to the left by 2 bits. In this way, the base layer image D54 is converted into an image having a 10-bit depth. Next, the adder 202 subtracts 128 from each of the pixel values of the enhancement layer image D55. Next, the adder 202 adds each of the pixel values without the subtracted 128 of the enhancement layer image D55 to a corresponding one of the pixel values of the 10-bit base layer image D54.

The adder 202 subtracts 128 from each of the pixel values here, but the adder 202 may subtract, instead of 128, a value obtained by rounding, to an integer, a half of the maximum pixel value represented by the bit depth of the enhancement layer image D55. Alternatively, the adder 202 may subtract the value added in the coding from each of the pixel values.

Next, the adder 202 clips V(x, y) within the possible range for each of the pixel values of a 10-bit image. For example, the adder 202 clips V(x, y) according to the operations shown by Expressions 4 and 5.

$$V(x,y)=V(x,y)>\max V10?\max V10:V(x,y) \quad \text{(Expression 4)}$$

$$V(x,y)=V(x,y)<\min V10?\min V10:V(x,y) \quad \text{(Expression 5)}$$

Here, the respective maxV10 and minV10 are the maximum value and the minimum value possible for the pixel values of the 10-bit image. Typically, maxV10 is 1023, and minV10 is 0. However, any other value may be set as maxV10 and/or minV10.

The adder 202 generates the 10-bit image D56 by executing the above-described processing.

Figure 7:
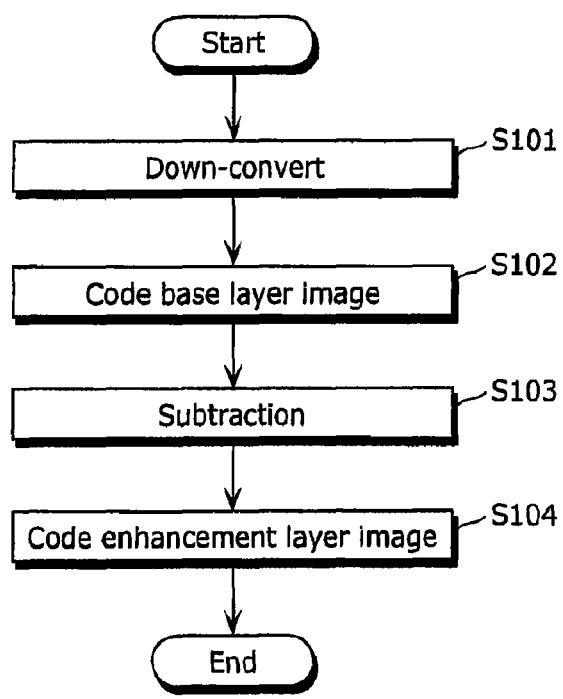
FIG. 7 is a flowchart showing processing performed by the image coding apparatus according to Embodiment 1.

FIG. 7 is a flowchart showing processing performed by the image coding apparatus shown in FIG. 3.

First, the down-converter 102 down-converts the 10-bit image D31 into the 8-bit base layer image D32 (S101).

Next, the MVC encoder 101 codes the base layer image D32 as a base view image (S102). Furthermore, the MVC encoder 101 decodes the coded base layer image D32 to generate the reconstructed image D33.

Next, the subtracter 103 generates the enhancement layer image D34, using the difference between the 10-bit image D31 and the reconstructed image D33 (S103).

Next, the MVC encoder 101 codes the enhancement layer image D34 as a non-base view image (S104). Next, the MVC encoder 101 outputs the coded base layer image D32 and enhancement layer image D34 in form of the MVC bitstream D35.

Figure 8:
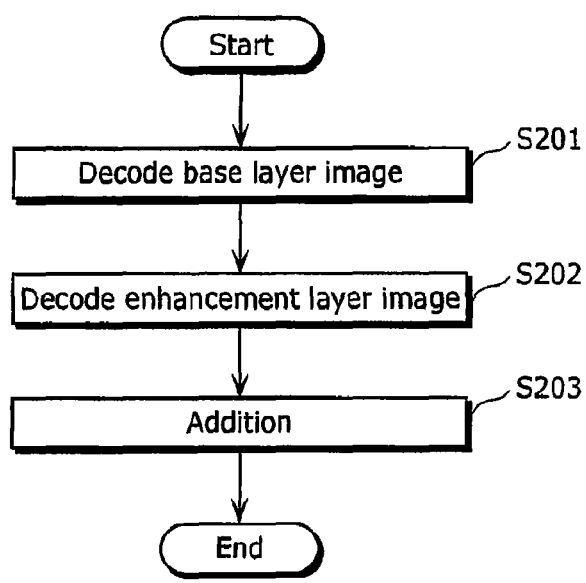
FIG. 8 is a flowchart showing processing performed by the image decoding apparatus according to Embodiment 1.

FIG. 8 is a flowchart showing processing performed by the image decoding apparatus shown in FIG. 5.

First, the MVC decoder 201 decodes base layer images in the base layer bitstream D51 (S201).

Next, the MVC decoder 201 decodes enhancement layer images in the enhancement layer bitstream D52 (S202). Thereby, the MVC decoder 201 generates the image sequence D53.

Next, the adder 202 adds the base layer image D54 included in the image sequence D53 and the enhancement layer image D55 included in the image sequence D53 to generate the 10-bit image D56 (S203).

In this way, the image coding apparatus according to Embodiment 1 generates the 8-bit image by down-converting the 10-bit image. The image coding apparatus codes the 8-bit image as a base view image. Furthermore, the image coding apparatus codes a difference value between the 10-bit image and the 8-bit image as an 8-bit non-base image. In this way, the 10-bit image is divided into the 8-bit base view image and the 8-bit non-base view image in the coding.

The image coding apparatus according to Embodiment 1 uses a reconstructed image of the coded base view image to calculate the difference between the 10-bit image and the 8-bit image. In this way, the image coding apparatus can absorb quantization distortion that is caused in the coding of the 8-bit image, when coding the 10-bit image.

Meanwhile, the image decoding apparatus according to Embodiment 1 decodes the 8-bit base view image and the 8-bit non-base view image. The image decoding apparatus generates a 10-bit image by synthesizing the decoded base view image and non-base view image.

Furthermore, the image decoding apparatus according to Embodiment 1 can also generate an 8-bit image by decoding only the base view image. This maintains compatibility with display devices that can represent images having 8 or less bits.

Here, the MVC encoder 101 and the MVC decoder 201 in Embodiment 1 do not need to have the capability of independently coding and decoding 10-bit images independently. Even when the MVC encoder 101 and the MVC decoder 201 do not have such capability, the image coding apparatus and image decoding apparatus according to Embodiment 1 can code and decode 10-bit images, respectively. Accordingly, it is possible to reduce the cost and time for developing an image coding apparatus and an image decoding apparatus for processing images having a greater bit depth.

As a matter of course, the MVC encoder 101 and MVC decoder 201 shown in Embodiment 1 can be used to code and decode 3D images, respectively.

In Embodiment 1, 8-bit images and 10-bit images are shown as examples. However, bit depths are not limited to 8 bits and 10 bits. Even in the case of a combination of bit depths other than a combination of 8-bit depth and 10-bit depth, the respective image coding apparatus and image decoding apparatus can code and decode images having a bit depth greater than the maximum bit depth in coding and decoding by the corresponding MVC encoder 101 and MVC decoder 201.

The Expressions shown in Embodiment 1 are exemplary, and thus other Expressions may be used. In particular, the right bit-shift operation is the same as division by a predetermined divisor. Likewise, the left bit-shift operation is the same as multiplication by a predetermined multiplier. The down-converter 102 rounds off the least significant bits of each pixel value in down-conversion in the above-described example. However, the down-converter 102 may cut off or round up the least significant bits of each pixel value.

Here, the base layer image and the enhancement layer image are images based on the same image, that is, the same view. Accordingly, in Embodiment 1, these images are referred to separately from a base view image and a non-base view image. However, the MVC encoder 101 and the MVC decoder 201 use a base layer image as a base view image, and an enhancement layer image as a non-base view image. Accordingly, these images may be referred to as a base view image and a non-base view image.

Embodiment 2

An image coding apparatus and an image decoding apparatus according to Embodiment 2 enable 3D 10-bit image representation using two 10-bit images.

Figure 9:
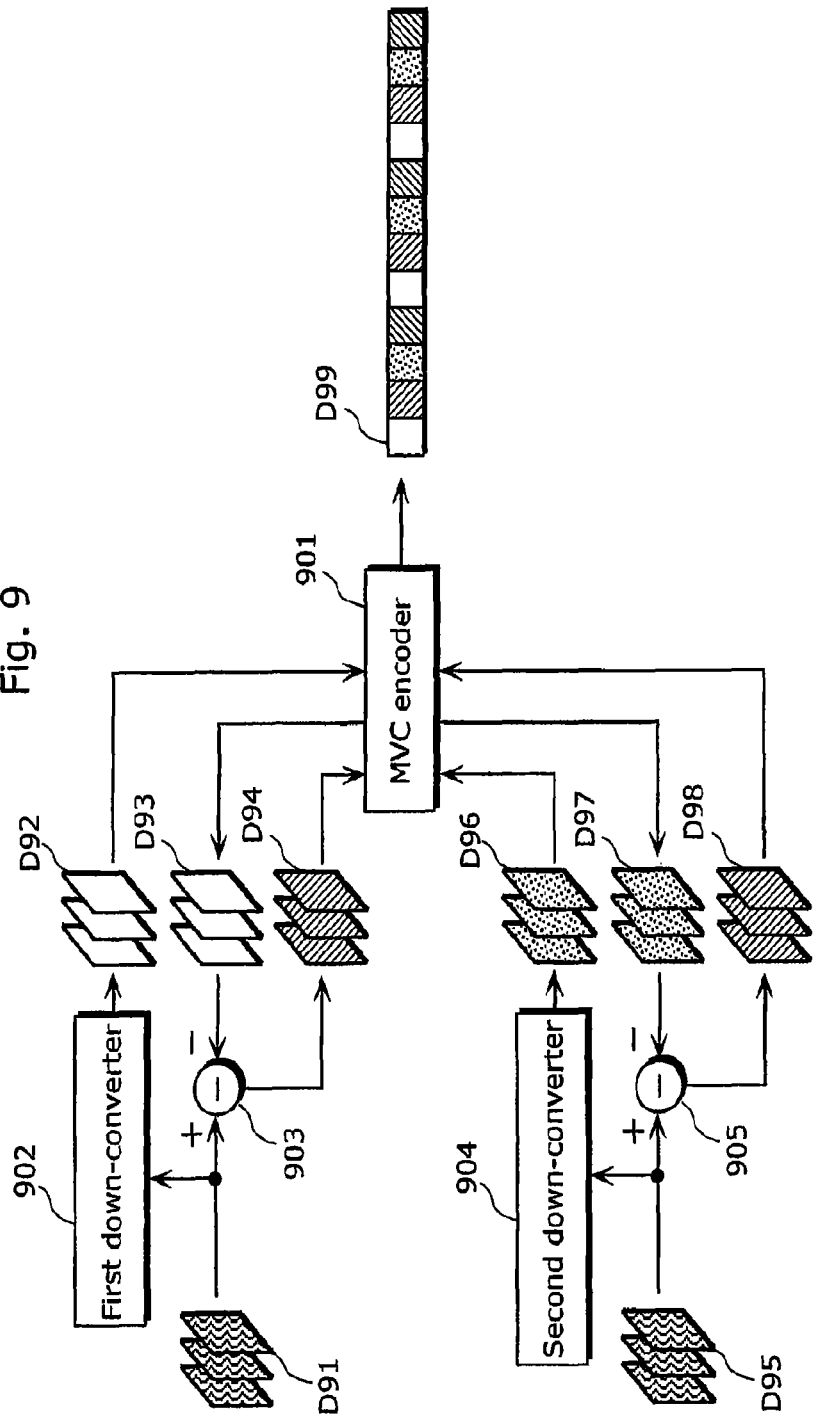
FIG. 9 is a structural diagram of an image coding apparatus according to Embodiment 2.

FIG. 9 is a structural diagram of an image coding apparatus according to Embodiment 2. The image coding apparatus shown in FIG. 9 includes an MVC encoder 901, a first down-converter 902, a first subtracter 903, a second down-converter 904, and a second subtracter 905. The image coding apparatus codes two 10-bit images that are a 10-bit base view image D91 and a 10-bit non-base view image D95.

The down-converter 902 down-converts the 10-bit base view image D91 into an 8-bit base-view base layer image D92. The 10-bit base view image D91 corresponds to a left-eye image, for example.

The MVC encoder 901 codes the 8-bit base-view base layer image D92. Next, the MVC encoder 901 decodes the coded 8-bit base-view base layer image D92 to generate a reconstructed image D93.

The first subtracter 903 calculates the difference between the 10-bit base view image D91 and the reconstructed image D93 to generate an 8-bit base-view enhancement layer image D94.

The MVC encoder 901 codes the base-view enhancement layer image D94 as a non-base view image.

The second down-converter 904 down-converts the 10-bit non-base view image D95 into an 8-bit non-base-view base layer image D96. The 10-bit non-base view image D95 corresponds to a right-eye image, for example.

The MVC encoder 901 codes the 8-bit non-base-view base layer image D96. Next, the MVC encoder 901 decodes the coded 8-bit non-base-view base layer image D96 to generate a reconstructed image D97.

The second subtracter 905 calculates the difference between the 10-bit non-base view image D95 and the reconstructed image D97 to generate an 8-bit non-base-view enhancement layer image D98.

The MVC encoder 901 codes the non-base-view enhancement layer image D98 as a non-base view image.

Next, the MVC encoder 901 superimposes the coded base-view base layer image D92, the coded base-view enhancement layer image D94, the coded non-base view base layer image D96, and the coded non-base view enhancement layer image D98 to generate an MVC bitstream D99.

Figure 10:
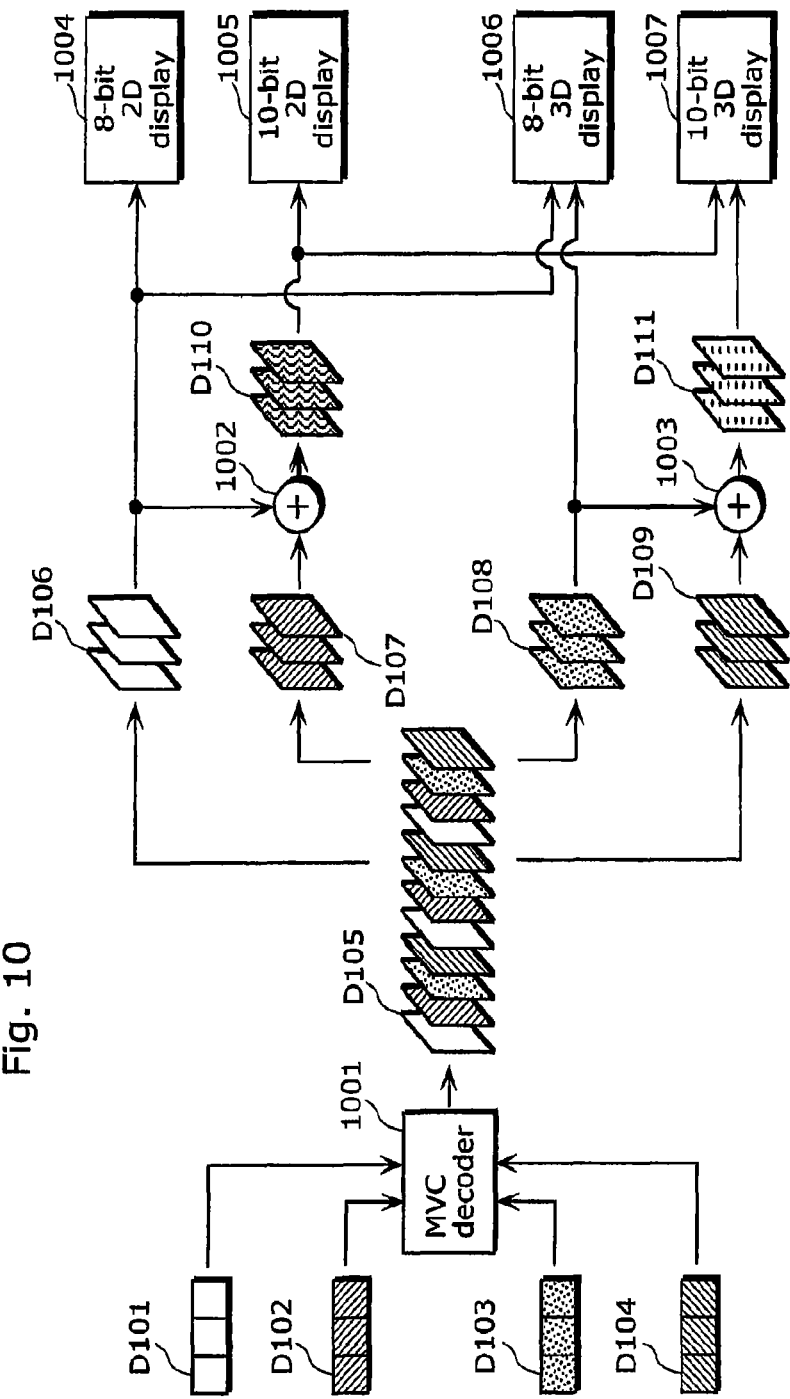
FIG. 10 is a structural diagram of an image decoding apparatus according to Embodiment 2.

FIG. 10 is a structural diagram of an image decoding apparatus according to Embodiment 2. The image decoding apparatus shown in FIG. 10 includes an MVC decoder 1001, a first adder 1002, and a second adder 1003.

The MVC decoder 1001 decodes base-view base layer images in a base-view base layer bitstream D101. Furthermore, the MVC decoder 1001 decodes base-view enhancement layer images in a base-view enhancement layer bitstream D102.

Likewise, the MVC decoder 1001 decodes non-base-view base layer images in a non-base-view base layer bitstream D103. The MVC decoder 1001 decodes non-base-view enhancement layer images in a non-base-view enhancement layer bitstream D104.

The MVC decoder 1001 may extract each of the bitstreams corresponding to the base view, non-base view, base layer, and enhancement layer, from the MVC bitstream D99 shown in FIG. 9, and decodes each bitstream. Next, the MVC decoder 1001 superimposes the decoded images in form of an image sequence D105.

The first adder 1002 adds a base-view base layer image D106 and a base-view enhancement layer image D107 in the image sequence D105 to generate a 10-bit base view image D110.

The second adder 1003 adds a non-base-view base layer image D108 and a non-base-view enhancement layer image D109 in the image sequence D105 to generate a 10-bit non-base view image D111.

The 8-bit 2D display 1004 represents an 8-bit 2D image by representing the base-view base layer image D106 included in the image sequence D105.

The 10-bit 2D display 1005 represents a 10-bit 2D image by representing the 10-bit base view image D110 generated by the first adder 1002.

The 8-bit 3D display 1006 represents an 8-bit 3D image by representing a combination of the base-view base layer image D106 and the non-base-view base layer image D108 included in the image sequence D105. At this time, for example, the base-view base layer image D106 corresponds to a left-eye image, and the non-base-view base layer image D108 corresponds to a right-eye image.

The 10-bit 3D display 1007 represents a 10-bit 3D image by representing a combination of the 10-bit base view image D110 generated by the first adder 1002 and the 10-bit non-base view image D111 generated by the second adder 1003. At this time, for example, the 10-bit base view image D110 corresponds to a left-eye image, and the 10-bit non-base view image D111 corresponds to a right-eye image.

As described above, the image coding apparatus and the image decoding apparatus according to Embodiment 2 enable 3D 10-bit image representation using two 10-bit images. Furthermore, with the above-described structure, it is possible to implement various types of representation including 2D representation of 8-bit images, 3D representation of 8-bit images, 2D representation of 10-bit images.

Embodiment 3

An image coding apparatus according to Embodiment 3 codes 10-bit images using motion prediction and inter-view prediction.

Figure 11:
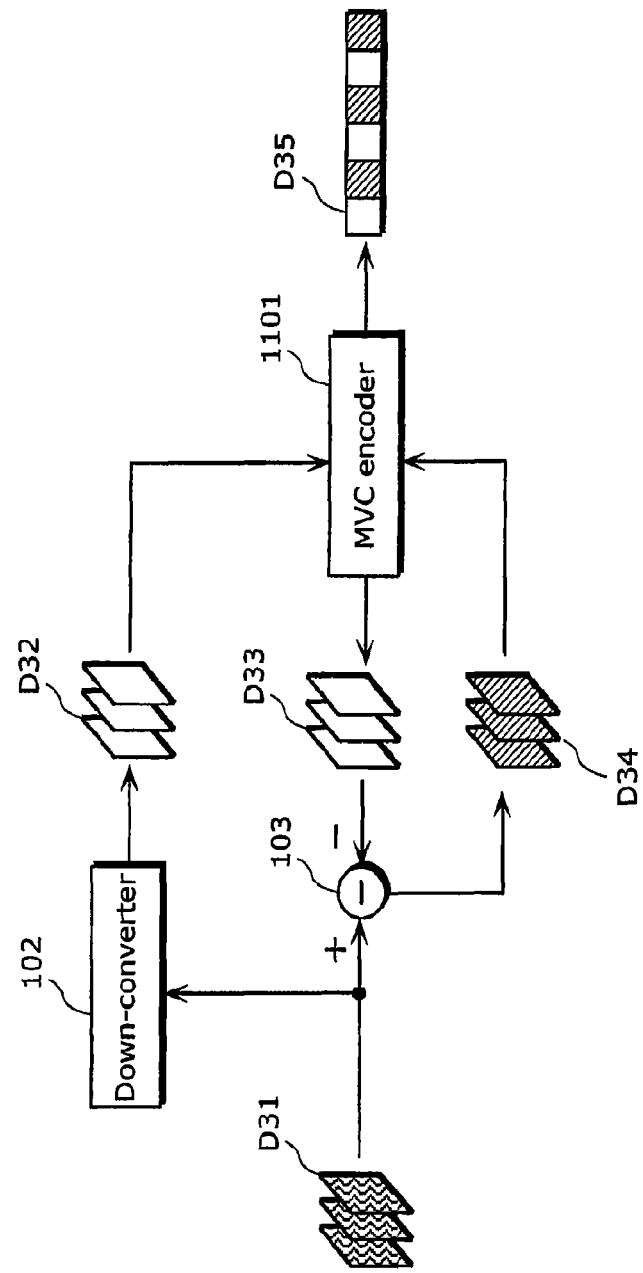
FIG. 11 is a structural diagram of an image coding apparatus according to Embodiment 3.

FIG. 11 is a structural diagram of an image coding apparatus according to Embodiment 3. The image coding apparatus shown in FIG. 11 includes an MVC encoder 1101, a down-converter 102, and a subtracter 103. The image coding apparatus according to Embodiment 3 includes an MVC encoder 1101 obtained by modifying an MVC encoder 101 of the image coding apparatus according to Embodiment 1 shown in FIG. 3. In terms of the other structural elements, the image coding apparatus according to Embodiment 3 is the same as the image coding apparatus according to Embodiment 1.

Figure 12:
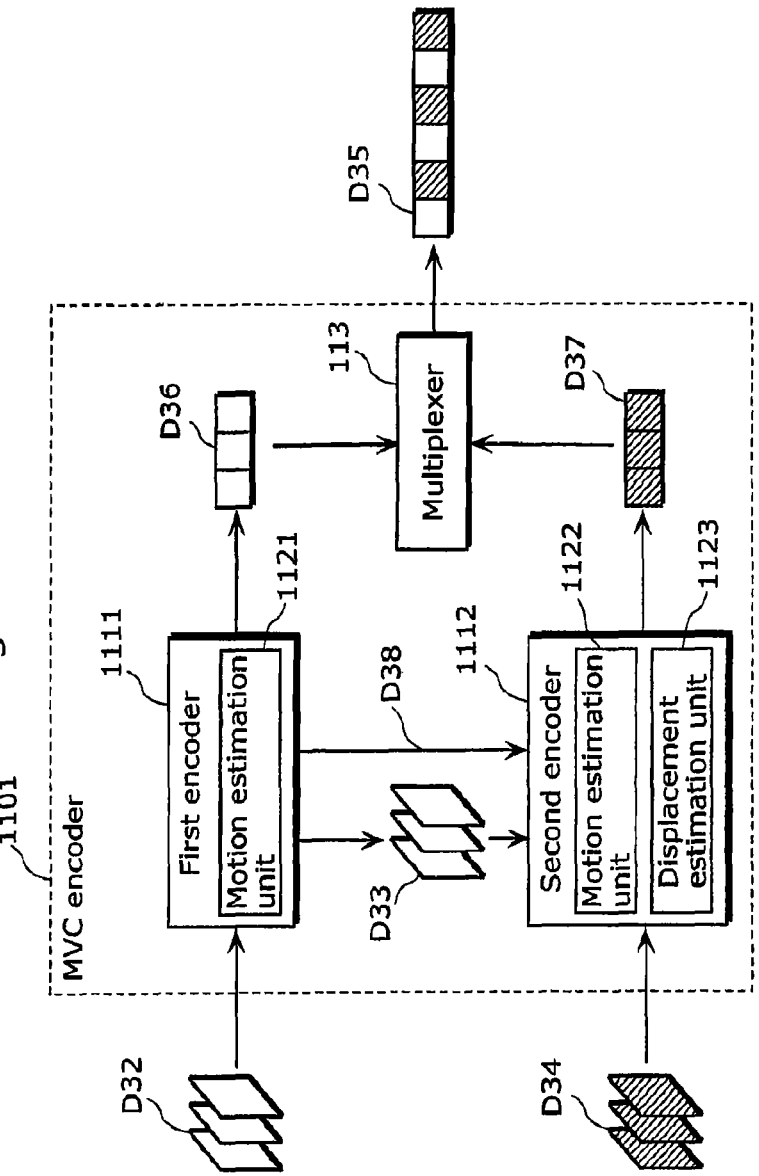
FIG. 12 is a structural diagram of an MVC encoder according to Embodiment 3.

FIG. 12 is a structural diagram of the MVC encoder 1101 shown in FIG. 11. The MVC encoder 1101 shown in FIG. 12 includes a first encoder 1111, a second encoder 1112, and a multiplexer 113. The first encoder 1111, the second encoder 1112, and the multiplexer 113 operate in the same manner as the first encoder 111, the second encoder 112, and the multiplexer 113 shown in FIG. 4 operate, respectively.

More specifically, the first encoder 1111 codes a base layer image D32 as a base view image to generate a base layer bitstream D36. Furthermore, the first encoder 1111 decodes the coded base layer image D32 to generate a reconstructed image D33.

Meanwhile, the second encoder 1112 codes an enhancement layer image D34 as a non-base view image to generate an enhancement layer bitstream D37.

Meanwhile, the multiplexer 113 superimposes the base layer bitstream D36 and the enhancement layer bitstream D37 to generate an MVC bitstream D35.

The first encoder 1111 according to Embodiment 3 uses motion prediction in coding the base layer image D32. Likewise, the second encoder 1112 uses motion prediction in coding the enhancement layer image D34. Meanwhile, the second encoder 1112 uses inter-view prediction in coding the enhancement layer image D34.

For this reason, the first encoder 1111 includes a motion estimation unit 1121 for estimating motion vectors to be used for motion prediction. Likewise, the second encoder 1112 includes a motion estimation unit 1122 for estimating motion vectors to be used for motion prediction. The second encoder 1112 further includes a displacement estimation unit 1123 for estimating displacement motion vectors to be used for inter-view prediction.

In order to perform the motion prediction, the motion estimation unit 1121 estimates motion vectors to be used for the motion prediction. The first encoder 1111 codes the base layer image D32 using a motion vector detected by the motion estimation unit 1121.

Here, the base layer image D32 and the enhancement layer image D34 are images generated from the same 10-bit image D31, and thus assumed to have the same motion information. Accordingly, the first encoder 1111 and the second encoder 1112 may use the same motion vector.

In other words, it is also possible to obtain information D38 of a motion vector, and code the enhancement layer image D34 using the motion vector estimated by the motion estimation unit 1121. In this case, the motion estimation unit 1122 of the second encoder 1112 is not necessarily required.

However, the enhancement layer image D34 includes quantization distortion because it has been generated depending on the reconstructed image D33. For this reason, the motion estimation unit 1122 of the second encoder 1112 may perform motion estimation within a range smaller than usual using a motion vector estimated by the motion estimation unit 1121.

For example, the motion estimation unit 1122 may obtain information D38 about an integer portion of the motion vector detected by the motion estimation unit 1121, and estimate the motion vector for the enhancement layer image D34 within a 1-pixel range in both the horizontal direction and the vertical direction from the integer pixel position co-located with the integer pixel position identified by the information D38.

The first encoder 1111 may quantize the motion vector estimated by the motion estimation unit 1121, and notify the second encoder 1112 of the information D38 about the quantized motion vector. The second encoder 1112 inversely quantizes the quantized motion vector. Meanwhile, the motion estimation unit 1122 may estimate a motion vector for the enhancement layer image D34 within a range which includes the pixel position shown by the inversely quantized motion vector and is smaller than the motion estimation range in the base layer image D32.

This makes it possible to reduce the amount of information to be processed. Furthermore, limiting the motion estimation range reduces unnecessary processing. Thereby, the processing speed is increased.

In order to perform inter-view prediction, the displacement estimation unit 1123 estimates displacement vectors. Inter-view prediction is to predict a non-base view image from a base view image. Typically, there is a displacement between a base view image and a corresponding non-base view image due to parallax. The displacement estimation unit 1123 estimates this displacement as a displacement vector. In Embodiment 3, the displacement estimation unit 1123 estimates this displacement using the reconstructed image D33 and the enhancement layer image D34.

Here, the reconstructed image D33 and the enhancement layer image D34 are images generated from the same 10-bit image D31, and therefore there is no such displacement. Accordingly, the second encoder 1112 may use a displacement vector (0, 0) indicating that its magnitude is 0 in the inter-view prediction.

However, the reconstructed image D33 and the enhancement layer image D34 include quantization distortion. Accordingly, the displacement estimation unit 1123 may estimate displacement within a range smaller than usual. For example, the displacement estimation unit 1123 may estimate displacement such that the difference between the reconstructed image D33 and the enhancement layer image D34 is within a 1-pixel range in both the horizontal direction and the vertical direction to obtain a displacement vector to be used in the inter-view prediction.

Here, the relationship between the reconstructed image D33 and the enhancement layer image D34 is approximately the same as the relationship between the most significant 8 bits and the least significant 2 bits of the 10-bit image D31. Accordingly, it is assumed that there is no correlation. For this reason, there is a possibility that inter-view prediction does not provide any effect. Therefore, it is preferable that inter-view prediction is performed in a limited manner as described above. This makes it possible to reduce unnecessary processing, and thereby increasing the processing speed.

Even when there is a displacement due to quantization distortion between the reconstructed image D33 and the enhancement layer image D34, it is assumed that the displacement due to the quantization distortion is within 1-pixel range. The restriction in the displacement estimation with only the sub-pixel accuracy are comparatively simple. Therefore, it is possible to reduce complexity in the implementations. For this reason, it is preferable that displacement estimation is restricted within a 1-pixel range. For the same reason, it is preferable that motion estimation is restricted within a 1-pixel range.

Embodiment 4

The processing described in Embodiment 1 can be simply implemented by an independent computer system, by recording, in a recording medium, a program for implementing the configurations for the image coding method and the image decoding method described in Embodiment 1. The recording medium may be any recording medium as long as the program can be recorded, such as a magnetic disk, an optical disk, a magnetic optical disk, an IC card, and a semiconductor memory.

Hereinafter, the applications to the image coding method and the image decoding method described in Embodiment 1 and systems using thereof will be described.

Figure 13:
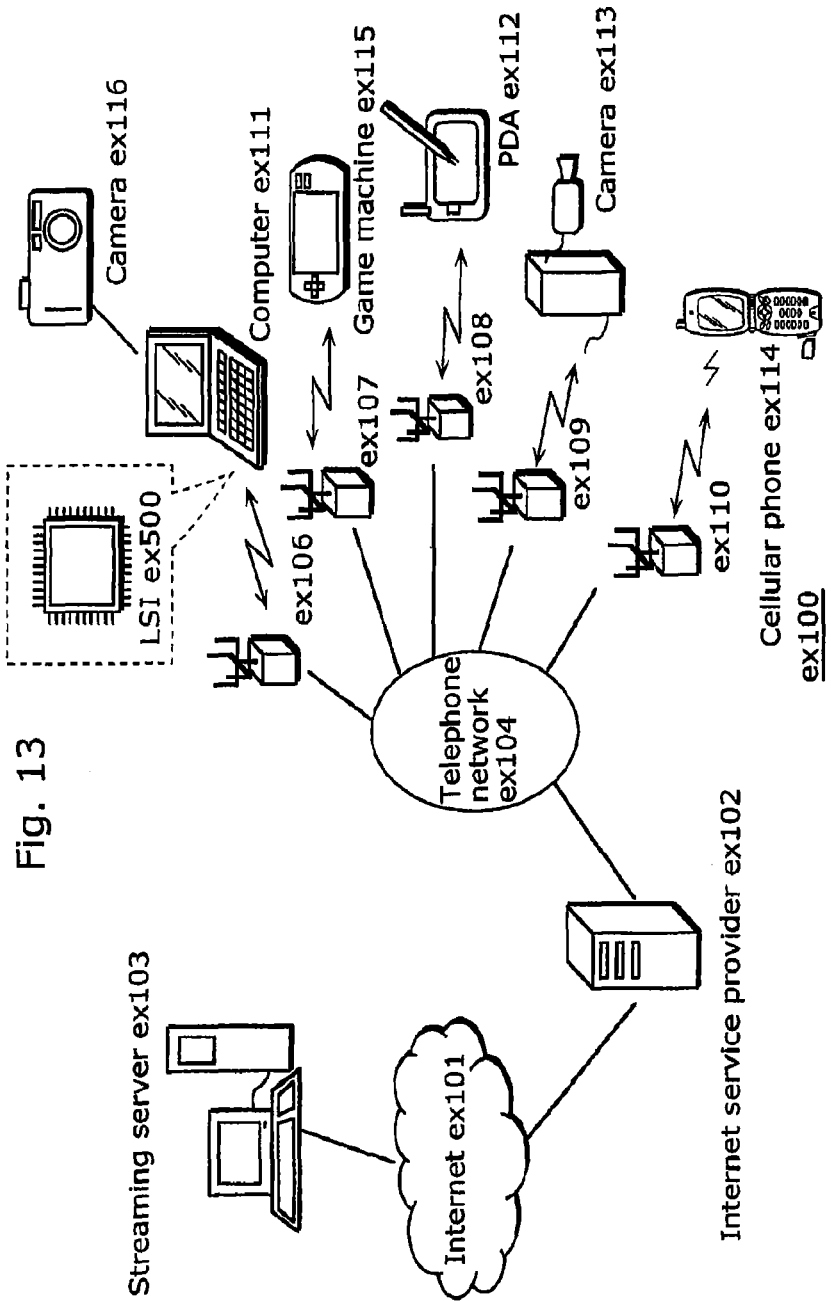
FIG. 13 schematically shows an overall configuration of a content providing system for implementing content distribution services.

FIG. 13 illustrates an overall configuration of a content providing system ex100 for implementing content distribution services. The area for providing communication services is divided into cells of desired size, and base stations ex106 to ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via an Internet ex101, an Internet service provider ex102, a telephone network ex104, as well as the base stations ex106 to ex110.

However, the configuration of the content providing system ex100 is not limited to the configuration shown in FIG. 13, and a combination in which any of the elements are connected is acceptable. In addition, each of the devices may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing moving images. A camera ex116, such as a digital video camera, is capable of capturing both still images and moving images. Furthermore, the cellular phone ex114 may be the one that meets any of the standards such as Global System for Mobile Communications (GSM), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of a live show and others. For such a distribution, a content (for example, video of a music live show) captured by the user using the camera ex113 is coded as described above in Embodiment 1, and the coded content is transmitted to the streaming server ex103. On the other hand, the streaming server ex103 carries out stream distribution of the received content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data.

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and moving images captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding images may be integrated into some type of a recording medium (such as a CD-ROM, a flexible disk, a hard disk) that is readable by the computer ex111 and others, and the coding and decoding processes may be performed using the software. Furthermore, when the cellular phone ex114 is equipped with a camera, the moving image data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients can receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

When each of the devices included in the content providing system ex100 performs coding and decoding, the image coding method and the image decoding method shown in Embodiment 1 may be used.

The cellular phone ex114 will be described as an example of such a device.

Figure 14:
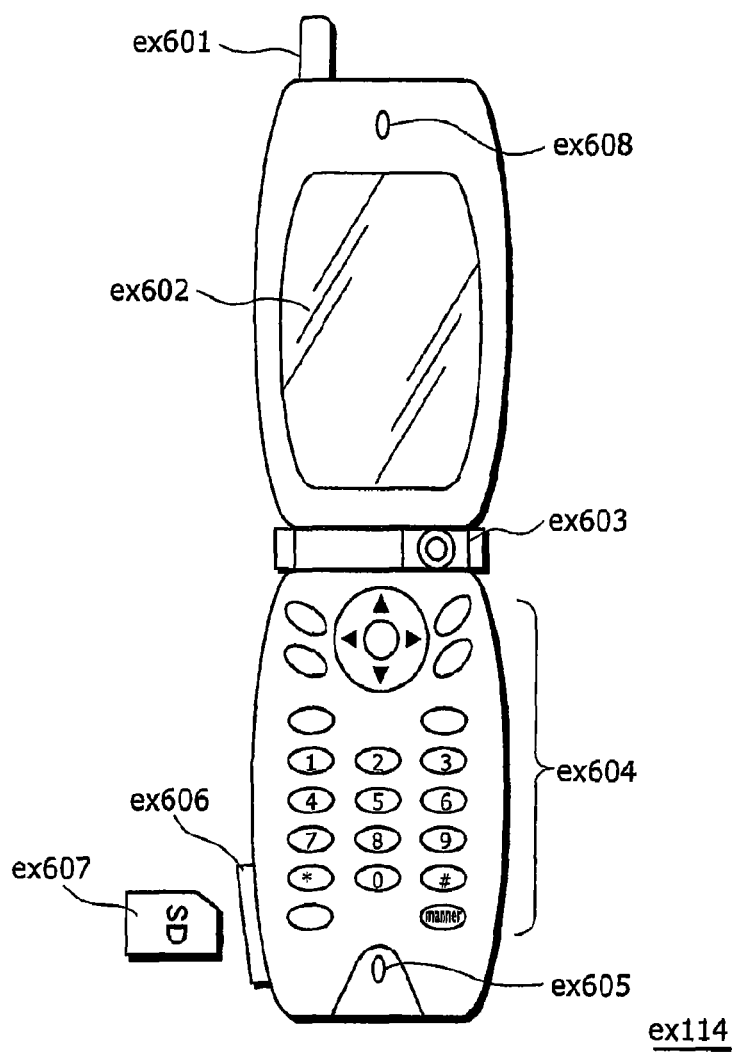
FIG. 14 shows an external view of a cellular phone.

FIG. 14 illustrates the cellular phone ex114 that uses the image coding method and the image decoding method described in Embodiment 1. The cellular phone ex114 includes: an antenna ex601 for transmitting and receiving radio waves through the base station ex110; a camera unit ex603 such as a CCD camera capable of capturing moving and still images; a display unit ex602 such as a liquid crystal display for displaying the data such as decoded video captured by the camera unit ex603 or received by the antenna ex601; a main body unit including a set of operation keys ex604; an audio output unit ex608 such as a speaker for output of audio; an audio input unit ex605 such as a microphone for input of audio; a recording medium ex607 for recording coded or decoded data including data of captured moving or still images, data of received e-mails, and data of moving or still images; and a slot unit ex606 for enabling the cellular phone ex114 to attach the recording medium ex607. The recording medium ex607 is a medium that stores a flash memory device within a plastic case, for example, an SD Card. The flash memory device is one type of Electrically Erasable and Programmable Read-Only Memory (EEPROM) which is a non-volatile memory that is electrically rewritable and erasable.

Figure 15:
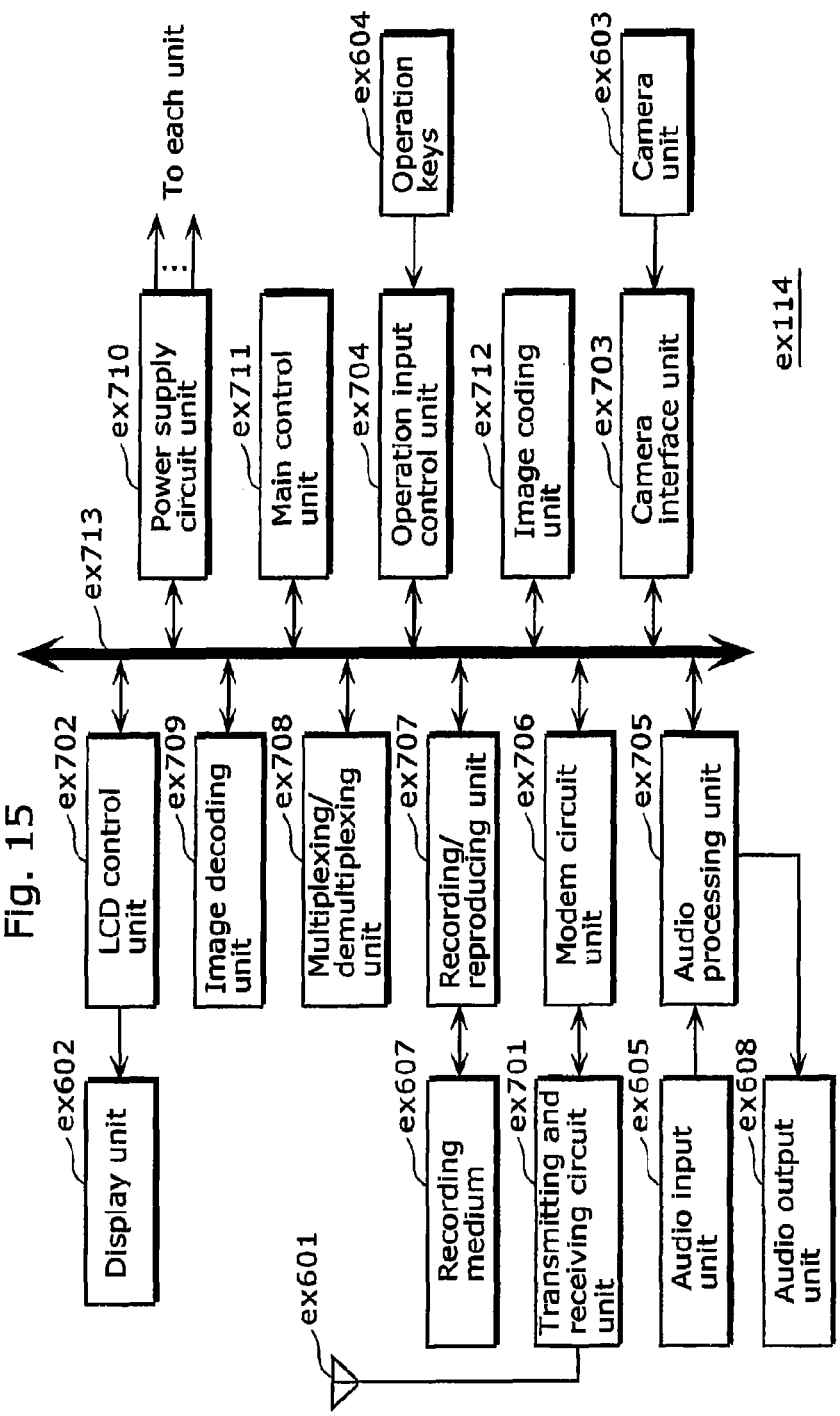
FIG. 15 is a block diagram showing an example of a configuration of the cellular phone.

Next, the cellular phone ex114 will be described with reference to FIG. 15. In the cellular phone ex114, a main control unit ex711 designed to control overall each unit of the main body including the display unit ex602 as well as the operation keys ex604 is connected mutually, via a synchronous bus ex713, to a power supply circuit unit ex710, an operation input control unit ex704, an image coding unit ex712, a camera interface unit ex703, a liquid crystal display (LCD) control unit ex702, an image decoding unit ex709, a multiplexing/demultiplexing unit ex708, a recording/reproducing unit ex707, a modem circuit unit ex706, and an audio processing unit ex705.

When a call-end key or a power key is turned ON by a user's operation, the power supply circuit unit ex710 supplies the respective units with power from a battery pack so as to activate the cell phone ex114 that is digital and is equipped with the camera.

In the cellular phone ex114, the audio processing unit ex705 converts the audio signals collected by the audio input unit ex605 in voice conversation mode into digital audio data under the control of the main control unit ex711 including a CPU, ROM, and RAM. Then, the modem circuit unit ex706 performs spread spectrum processing on the digital audio data, and the transmitting and receiving circuit unit ex701 performs digital-to-analog conversion and frequency conversion on the data, so as to transmit the resulting data via the antenna ex601. In addition, in the cellular phone ex114, the transmitting and receiving circuit unit ex701 amplifies the data received by the antenna ex601 in voice conversation mode and performs frequency conversion and the analog-to-digital conversion on the data. Then, the modem circuit unit ex706 performs inverse spread spectrum processing on the data, and the audio processing unit ex705 converts it into analog audio data, so as to output it via the audio output unit ex608.

Furthermore, when an e-mail in data communication mode is transmitted, text data of the e-mail inputted by operating the operation keys ex604 of the main body is sent out to the main control unit ex711 via the operation input control unit ex704. The main control unit ex711 causes the modem circuit unit ex706 to perform spread spectrum processing on the text data, and the transmitting and receiving circuit unit ex701 performs the digital-to-analog conversion and the frequency conversion on the resulting data to transmit the data to the base station ex110 via the antenna ex601.

When image data is transmitted in data communication mode, the image data captured by the camera unit ex603 is supplied to the image coding unit ex712 via the camera interface unit ex703. When the image data is not transmitted, the image data captured by the camera unit ex603 can be displayed directly on the display unit ex602 via the camera interface unit ex703 and the LCD control unit ex702.

The image coding unit ex712 including the image coding apparatus as described in the present invention compresses and codes the image data supplied from the camera unit ex603 using the coding method employed by the image coding apparatus as shown in Embodiment 1 so as to transform the data into coded image data, and sends the data out to the multiplexing/demultiplexing unit ex708. Furthermore, the cellular phone ex114 simultaneously sends out, as digital audio data, the audio received by the audio input unit ex605 during the capturing with the camera unit ex603 to the multiplexing/demultiplexing unit ex708 via the audio processing unit ex705.

The multiplexing/demultiplexing unit ex708 multiplexes the coded image data supplied from the image coding unit ex712 and the audio data supplied from the audio processing unit ex705, using a predetermined method. Then, the modem circuit unit ex706 performs spread spectrum processing on the multiplexed data obtained by the multiplexing/demultiplexing unit ex708. After the digital-to-analog conversion and frequency conversion on the data, the transmitting and receiving circuit unit ex701 transmits the resulting data via the antenna ex601.

When receiving data of a video file which is linked to a Web page and others in data communication mode, the modem circuit unit ex706 performs inverse spread spectrum processing on the data received from the base station ex110 via the antenna ex601, and sends out the multiplexed data obtained as a result of the inverse spread spectrum processing to the multiplexing/demultiplexing unit ex708.

In order to decode the multiplexed data received via the antenna ex601, the multiplexing/demultiplexing unit ex708 demultiplexes the multiplexed data into a bitstream of image data and that of audio data, and supplies the coded image data to the image decoding unit ex709 and the audio data to the audio processing unit ex705, respectively via the synchronous bus ex713.

Next, the image decoding unit ex709 including the image decoding apparatus as described in the present invention decodes the bitstream of the image data using the decoding method corresponding to the coding method as shown in Embodiment 1 so as to generate reproduced video data, and supplies this data to the display unit ex602 via the LCD control unit ex702. Thus, the video data included in the video file linked to the Web page, for instance, is displayed. Simultaneously, the audio processing unit ex705 converts the audio data into analog audio data, and supplies the data to the audio output unit ex608. Thus, the audio data included in the video file linked to the Web page, for instance, is reproduced.

Figure 16:
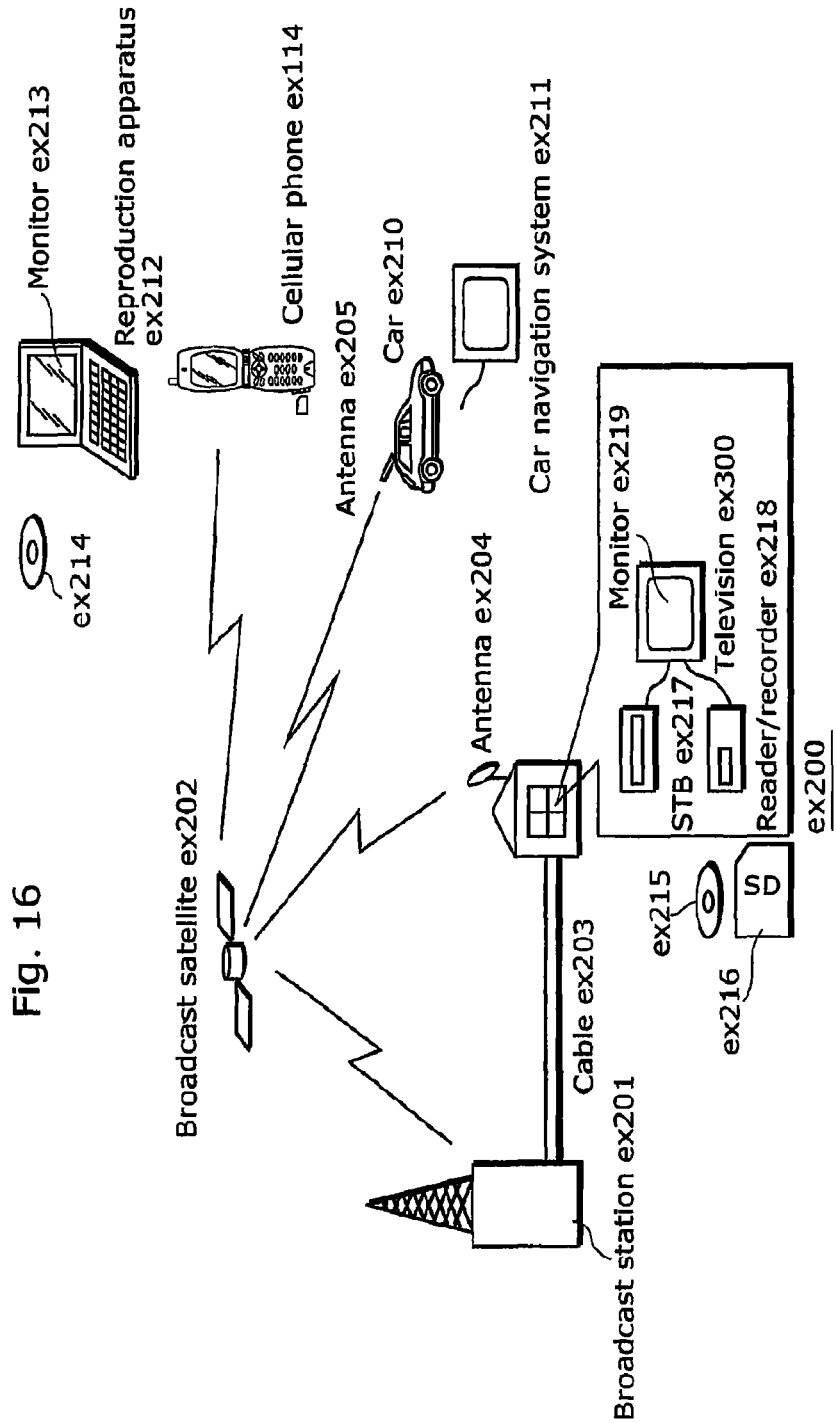
FIG. 16 schematically shows an example of an overall configuration of a digital broadcasting system.

The present invention is not limited to the above-mentioned system because terrestrial or satellite digital broadcasting has been in the news lately, and at least either the image coding apparatus or the image decoding apparatus described in Embodiment 1 can be incorporated into a digital broadcasting system as shown in FIG. 16. More specifically, a broadcast station ex201 communicates or transmits, via radio waves to a broadcast satellite ex202, audio data, video data, or a bitstream obtained by multiplexing the audio data and the video data. Upon receipt of the bitstream, the broadcast satellite ex202 transmits radio waves for broadcasting. Then, a home-use antenna ex204 with a satellite broadcast reception function receives the radio waves, and a device, such as a television (receiver) ex300 and a set top box (STB) ex217 decodes a coded bitstream and reproduces the decoded bitstream. Furthermore, a reader/recorder ex218 that reads and decodes such a bitstream obtained by multiplexing image data and audio data that are recorded on recording media ex215 and 216, such as a CD and a DVD may include the image decoding apparatus as shown in Embodiment 1. In this case, the reproduced video signals are displayed on a monitor ex219. It is also possible to implement the image decoding apparatus in the set top box ex217 connected to a cable ex203 for a cable television or an antenna ex204 for satellite and/or terrestrial broadcasting, so as to reproduce the video signals on the monitor ex219 of the television ex300. The image decoding apparatus may be included not in the set top box but in the television ex300. Also, a car ex210 having an antenna ex205 can receive signals from the satellite ex202 or the base station ex201 for reproducing video on a display device such as a car navigation system ex211 set in the car ex210.

Furthermore, the image decoding apparatus or the image coding apparatus as shown in Embodiment 1 can be implemented in the reader/recorder ex218 (i) for reading and decoding the video data, the audio data, or the coded bitstream obtained by multiplexing the video data and the audio data, or (ii) for coding the video data, the audio data, or the coded bitstream obtained by multiplexing the video data and the audio data and recording the resulting data as the multiplexed data on the recording medium ex215. Here, the video data and the audio data are recorded on the recording medium ex215, such as a BD and a DVD. In this case, the reproduced video signals are displayed on the monitor ex219. Furthermore, the reproduced video signals can be reproduced by another device or system, using the recording medium ex215 on which the coded bitstream is recorded. For example, another reproduction apparatus ex212 can reproduce the video signals on a monitor ex213, using a recording medium ex214 on which the coded bitstream is copied.

Furthermore, it is also possible to implement the image decoding apparatus in the set top box ex217 connected to the cable ex203 for a cable television or the antenna ex204 for satellite and/or terrestrial broadcasting, so as to reproduce the video signals on the monitor ex219 of the television ex300. The image decoding apparatus may be included not in the set top box but in the television ex300.

Figure 17:
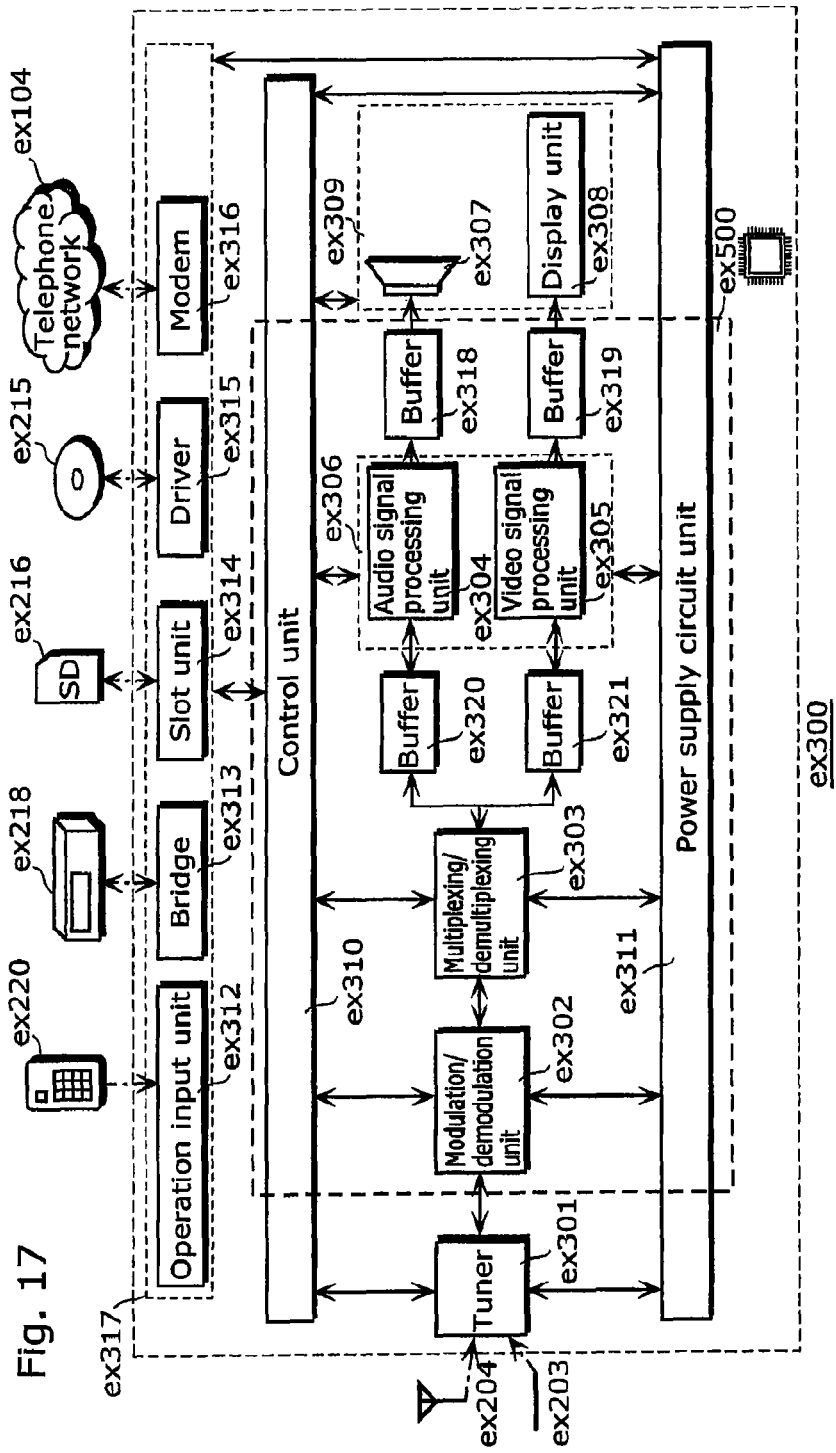
FIG. 17 is a block diagram showing an example of a configuration of a television.

FIG. 17 illustrates the television (receiver) ex300 that uses the image coding method and the image decoding method described in Embodiment 1. The television ex300 includes: a tuner ex301 that obtains or provides a bitstream of video information from and through the antenna ex204 or the cable ex203, etc. that receives a broadcast; a modulation/demodulation unit ex302 that demodulates the received coded data or modulates data into coded data to be supplied outside; and a multiplexing/demultiplexing unit ex303 that demultiplexes the modulated data into video data and audio data, or multiplexes the coded video data and audio data into data. The television ex300 further includes: a signal processing unit ex306 including an audio signal processing unit ex304 and a video signal processing unit ex305 that decode audio data and video data and code audio data and video data, respectively; a speaker ex307 that provides the decoded audio signal; and an output unit ex309 including a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, a configuration will be described in which the television ex300 decodes data obtained from outside through the antenna ex204 and others and reproduces the decoded data. In the television ex300, upon receipt of a user operation from a remote controller ex220 and others, the multiplexing/demultiplexing unit ex303 demultiplexes the video data and audio data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in Embodiment 1, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read a coded bitstream not through a broadcast and others but from the recording media ex215 and ex216, such as a magnetic disk, an optical disk, and an SD card. Next, a configuration will be described in which the television ex300 codes an audio signal and a video signal, and transmits the data outside or writes the data on a recording medium. In the television ex300, upon receipt of a user operation from the remote controller ex220 and others, the audio signal processing unit ex304 codes an audio signal, and the video signal processing unit ex305 codes a video signal, under control of the control unit ex310 using the coding method as described in Embodiment 1. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in buffers ex320 and ex321, and others so that the signals are reproduced in synchronization with each other. Here, the buffers ex318 to ex321 may be plural as illustrated, or at least one buffer may be shared in the television ex300. Furthermore, data may be stored in a buffer other than the buffers ex318 to ex321 so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be not capable of coding, multiplexing, and providing outside data but capable of only one of receiving, decoding, and providing outside data.

Furthermore, when the reader/recorder ex218 reads or writes a coded bitstream from or in a recording medium, one of the television ex300 and the reader/recorder ex218 may decode or code the coded bitstream, and the television ex300 and the reader/recorder ex218 may share the decoding or coding.

Figure 18:
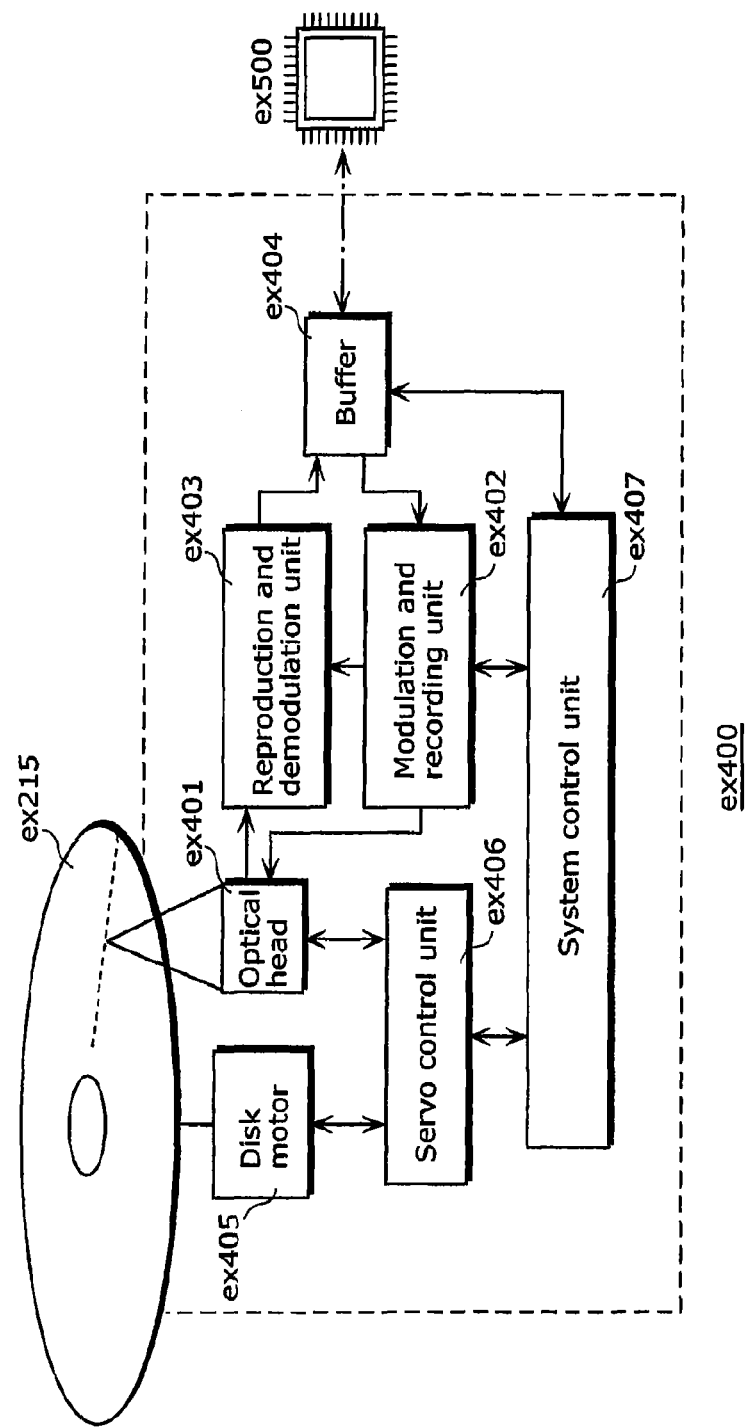
FIG. 18 is a block diagram showing an example of a configuration of an information reproducing and recording unit that reads and writes information from and on a recording medium that is an optical disk.

As an example, FIG. 18 illustrates a configuration of an information reproducing/recording unit ex400 when data is read or written from or in an optical disk. The information reproducing/recording unit ex400 includes constituent elements ex401 to ex407 to be described hereinafter. The optical head ex401 irradiates a laser spot on a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. A disk motor ex405 rotates the recording medium ex215. A servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer to ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 19:
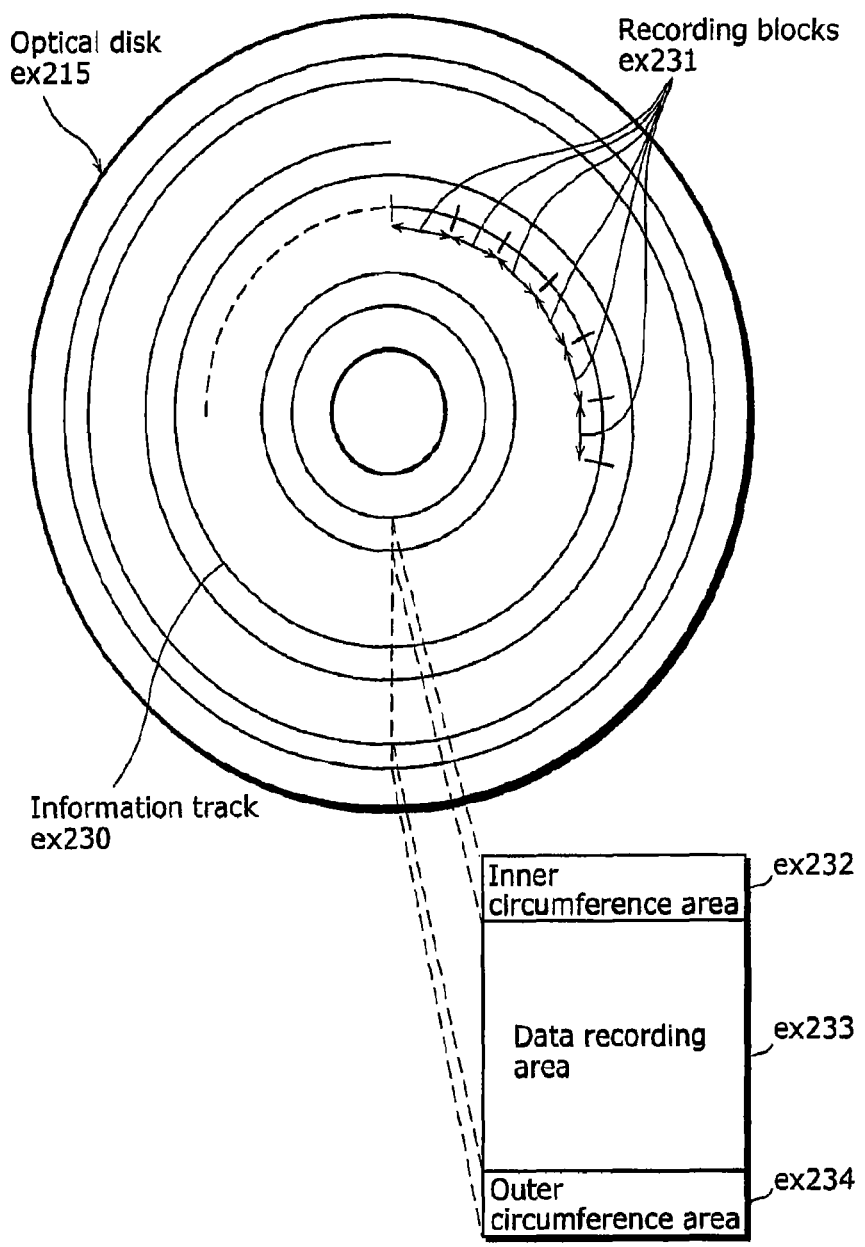
FIG. 19 shows an example of a configuration of a recording medium that is an optical disk.

FIG. 19 schematically illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. An apparatus that records and reproduces data reproduces the information track ex230 and reads the address information so as to determine the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio data, coded video data, or coded data obtained by multiplexing the coded audio data and the coded video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and recording information having different layers from various angles.

Furthermore, the car ex210 having the antenna ex205 can receive data from the satellite ex202 and others, and reproduce video on the display device such as the car navigation system ex211 set in the car ex210, in a digital broadcasting system ex200. Here, a configuration of the car navigation system ex211 will be a configuration, for example, including a GPS receiving unit from the configuration illustrated in FIG. 17. The same will be true for the configuration of the computer ex111, the cellular phone ex114, and others. Furthermore, similarly to the television ex300, a terminal such as the cellular phone ex114 may have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus.

As such, the image coding method and the image decoding method in Embodiment 1 can be used in any of the devices and systems described. Thus, the advantages described in Embodiment 1 can be obtained.

Furthermore, the present invention is not limited to Embodiments, and various modifications and revisions are possible without departing from the scope of the present invention.

Embodiment 5

Figure 20:
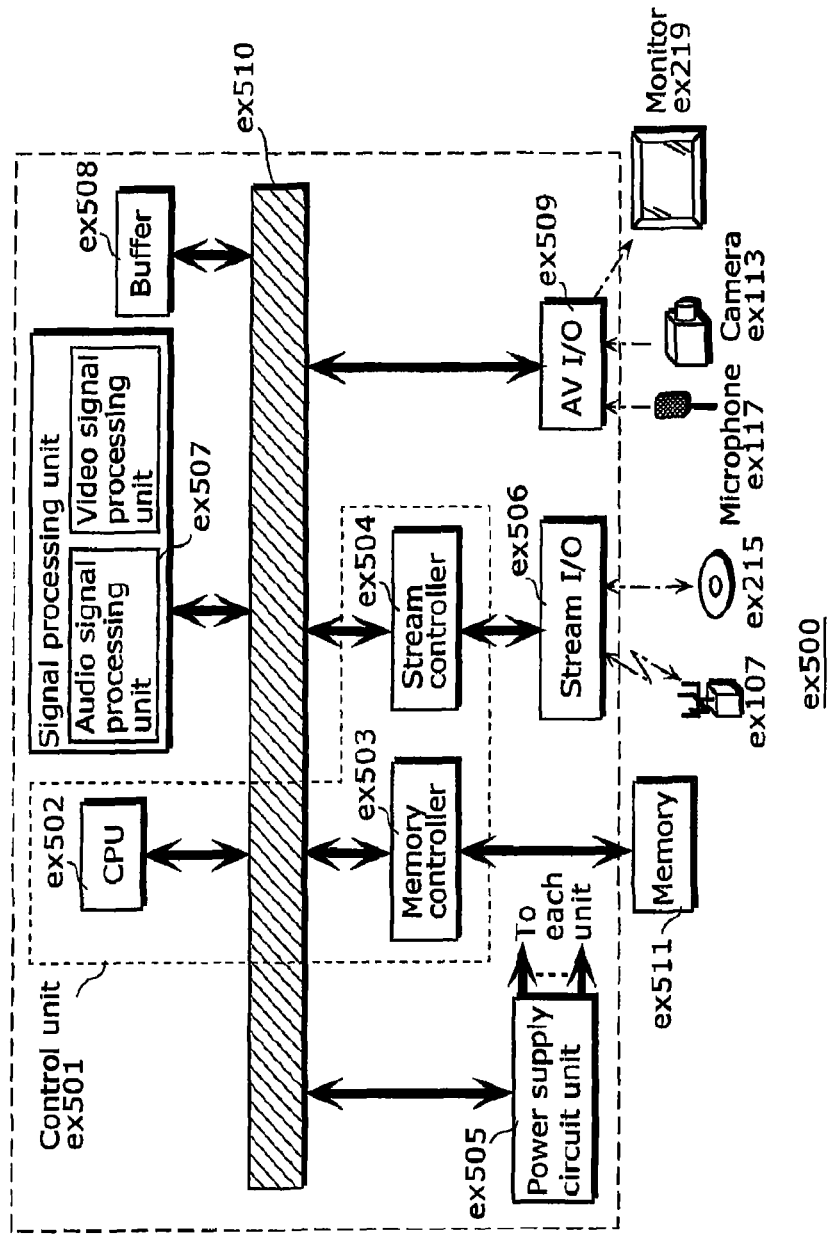
FIG. 20 is a block diagram showing an example of a configuration of an integrated circuit for implementing the image coding method and the image decoding method according to each of Embodiments.

Each of the image coding method, the image coding apparatus, the image decoding method, and the image decoding apparatus in each of Embodiments is typically achieved in the form of an integrated circuit or a Large Scale Integrated (LSI) circuit. As an example of the LSI, FIG. 20 illustrates a configuration of the LSI ex500 that is made into one chip. The LSI ex500 includes elements ex501 to ex509 to be described below, and the elements are connected to each other through a bus ex510. The power supply circuit unit ex505 is activated by supplying each of the elements with power when power is on.

For example, when coding is performed, the LSI ex500 receives an AV signal from a microphone ex117, a camera ex113, and others through an AV IO ex509 under control of a control unit ex501 including a CPU ex502, a memory controller ex503, and a stream controller ex504. The received AV signal is temporarily stored in a memory ex511 outside the LSI ex500, such as an SDRAM. Under control of the control unit ex501, the stored data is subdivided into data portions according to the processing amount and speed as necessary. Then, the data portions are transmitted to a signal processing unit ex507. The signal processing unit ex507 codes an audio signal and/or a video signal. Here, the coding of the video signal is the coding described in Embodiments. Furthermore, the signal processing unit ex507 sometimes multiplexes the coded audio data and the coded video data, and a stream I/O ex506 provides the multiplexed data outside. The provided bitstream is transmitted to a base station ex107, or written on the recording medium ex215. When data sets are multiplexed, the data sets should be temporarily stored in the buffer ex508 so that the data sets are synchronized with each other.

For example, when coded data is decoded, the LSI ex500 temporarily stores, in the memory ex511, the coded data obtained from the base station ex107 through the stream I/O ex506 or read from the recording medium ex215 under control of the control unit ex501. Under control of the control unit ex501, the stored data is subdivided into data portions according to the processing amount and speed as necessary. Then, the data portions are transmitted to the signal processing unit ex507. The signal processing unit ex507 decodes audio data and/or video data. Here, the decoding of the video signal is the decoding described in Embodiments. Furthermore, a decoded audio signal and a decoded video signal may be temporarily stored in the buffer ex508 and others so that the signals can be reproduced in synchronization with each other. Each of the output units, such as the cellular phone ex114, the game machine ex115, and the television ex300 provides the decoded output signal through, for example, the memory 511 as necessary.

Although the memory ex511 is an element outside the LSI ex500 in the description, it may be included in the LSI ex500. The buffer ex508 is not limited to one buffer, but may be composed of buffers. Furthermore, the LSI ex500 may be made into one chip or a plurality of chips.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. A Field Programmable Gate Array (FPGA) that is programmable after manufacturing an LSI or a reconfigurable processor allowing reconfiguration of the connection or configuration of an LSI can be used for the same purpose.

In the future, with advancement in semiconductor technology, a brand-new technology may replace LSI. The functional blocks can be integrated using such a technology. One such possibility is that the present invention is applied to biotechnology.

Although the coding method, the coding apparatus, the decoding method, and the decoding apparatus according to the present invention have been described based on the exemplary Embodiments, the present invention is not limited to the Embodiments. Those skilled in the art will readily appreciate that many modifications are possible in the exemplary Embodiments without materially departing from the novel teachings and advantages of the present invention. Accordingly, all such modifications and other embodiments conceivable by arbitrarily combining the structural elements and/or steps of different embodiments are intended to be included within the scope of the present invention.

INDUSTRIAL APPLICABILITY

Image coding apparatuses and image decoding apparatuses according to the present invention are applicable to television sets, digital video recorders, car navigation devices, cellular phones, digital cameras or digital video cameras, and the like.

REFERENCE SIGNS LIST 101, 901, 1101 MVC encoder
102 Down-converter
103 Subtracter
111, 1111 First encoder
112, 1112 Second encoder
113, 213 Multiplexer
201, 1001 MVC decoder
202 Adder
211 First decoder
212 Second decoder
902 First down-converter
903 First subtracter
904 Second down-converter
905 Second subtracter
1002 First adder
1003 Second adder
1004 8-bit 2D display
1005 10-bit 2D display
1006 8-bit 3D display
1007 10-bit 3D display
1121, 1122 Motion estimation unit
1123 Displacement estimation unit
D11, D23 Base view image
D12, D24 Non-base view image
D13, D33, D93, D97 Reconstructed image
D14, D21 Base view bitstream
D15, D22 Non-base view bitstream
D16, D35, D99 MVC bitstream
D25, D53, D105 Image sequence
D31, D56 10-bit image
D32, D54 Base layer image
D34, D55 Enhancement layer image
D36, D51 Base layer bitstream
D37, D52 Enhancement layer bitstream
D38 Information
D91, 110 10-bit base view image
D92, D106 Base-view base layer image
D94, D107 Base-view enhancement layer image
D95, D111 10-bit non-base view image
D96, D108 Non-base-view base layer image
D98, D109 Non-base-view enhancement layer image
D101 Base-view base layer bitstream
D102 Base-view enhancement layer bitstream
D103 Non-base-view base layer bitstream
D104 Non-base-view enhancement layer bitstream
ex100 Content providing system
ex101 Internet
ex102 Internet service provider
ex103 Streaming server
ex104 Telephone network
ex106, ex107, ex108, ex109, ex110 Base station
ex111 Computer
ex112 PDA
ex113, ex116 Camera
ex114 Cellular phone equipped with camera (Cellular phone)
ex115 Game machine
ex117 Microphone
ex200 Digital broadcasting system
ex201 Broadcast station
ex202 Broadcast satellite (satellite)
ex203 Cable
ex204, ex205, ex601 Antenna

27 ex210 Car
ex211 Car navigation system
ex212 Reproduction apparatus
ex213, ex219 Monitor
ex214, ex215, ex216, ex607 Recording medium
ex217 Set top box (STB)
ex218 Reader/recorder
ex220 Remote controller
ex230 Information track
ex231 Recording blocks
ex232 Inner circumference area
ex233 Data recording area
ex234 Outer circumference area
ex300 Television
ex301 Tuner
ex302 Modulation/demodulation unit
ex303 Multiplexing/demultiplexing unit
ex304 Audio signal processing unit
ex305 Video signal processing unit
ex306, ex507 Signal processing unit
ex307 Speaker
ex308, ex602 Display unit
ex309 Output unit
ex310, ex501 Control unit
ex311, ex505, ex710 Power supply circuit unit
ex312 Operation input unit
ex313 Bridge
ex314, ex606 Slot unit
ex315 Driver
ex316 Modem
ex317 Interface unit
ex318, ex319, ex320, ex321, ex404, ex508 Buffer
ex400 Information reproducing/recording unit
ex401 Optical head
ex402 Modulation and recording unit
ex403 Reproduction and demodulation unit
ex405 Disk motor
ex406 Servo control unit
ex407 System control unit
ex500 LSI
ex502 CPU
ex503 Memory controller
ex504 Stream controller
ex506 Stream I/O
ex509 AV I/O
ex510 Bus
ex511 Memory
ex603 Camera unit
ex604 Operation keys
ex605 Audio input unit
ex608 Audio output unit
ex701 Transmitting and receiving circuit unit
ex702 LCD control unit
ex703 Camera interface unit (camera I/F unit)
ex704 Operation input control unit
ex705 Audio processing unit
ex706 Modem circuit unit
ex707 Recording/reproducing unit
ex708 Multiplexing/demultiplexing unit
ex709 Image decoding unit
ex711 Main control unit
ex712 Image coding unit
ex713 Synchronous bus

28

The invention claimed is:

1. An image coding apparatus which codes a current image to be coded having a bit depth greater than a predetermined bit depth, the bit depth indicating information capacity per pixel, said image coding apparatus comprising:
a down-converter which down-converts the current image into a base layer image having a bit depth equal to or less than the predetermined bit depth;
an MVC (multiview video coding) encoder which (i) is an encoder for coding a multiview video including a base view image of a base view and a non-base view image of a non-base view different from the base view, and (ii) codes the base layer image as the base view image and decodes the base layer image coded as the base view image to generate a reconstructed image; and
a subtracter which calculates differences between characteristics of pixel values of the pre-down-conversion current image and characteristics of corresponding pixel values of the reconstructed image, and generates, using the calculated differences, an enhancement layer image having a bit depth equal to or less than the predetermined bit depth, the enhancement layer image being an image for increasing the bit depth of the base layer image,
wherein said MVC encoder further codes the enhancement layer image as the non-base view image.

2. The image coding apparatus according to claim 1,
wherein said down-converter down-converts the current image into the base layer image by shifting down each of pixel values of the current image, and
said subtracter shifts up each of pixel values of the reconstructed image such that the reconstructed image and the pre-down-conversion current image have the same bit depth, calculates the differences between the respective pixel values of the pre-down-conversion current image and the corresponding shifted-up pixel values of the reconstructed image, and generates, using the calculated differences, the enhancement layer image.

3. The image coding apparatus according to claim 1,
wherein said down-converter down-converts the current image into the base layer image by dividing each of pixel values of the current image by a predetermined divisor, and
said subtracter multiplies each of pixel values of the reconstructed image by a predetermined multiplier such that the reconstructed image and the pre-down-conversion current image have the same bit depth, calculates the differences between the respective pixel values of the pre-down-conversion current image and the corresponding post-multiplication pixel values of the reconstructed image, and generates, using the calculated differences, the enhancement layer image.

4. The image coding apparatus according to claim 2,
wherein said subtracter generates the enhancement layer image by adding, to each of the differences, a predetermined value for making the corresponding one of the pixel values of the enhancement layer image into a positive value.

5. The image coding apparatus according to claim 2,
wherein said subtracter generates the enhancement layer image by adding, to each of the differences, a value obtained by rounding, to an integer, a half of a maximum pixel value represented by the bit depth of the enhancement layer image.

6. The image coding apparatus according to claim 1,
wherein said MVC encoder obtains a motion vector by performing motion estimation on the base layer image, codes the base layer image by performing motion prediction using the obtained motion vector, and codes the enhancement layer image by performing motion prediction using the motion vector used to code the base layer image.

7. The image coding apparatus according to claim 1, wherein said MVC encoder:
   obtains a first motion vector by performing motion estimation on the base layer image, and codes the base layer image by performing motion prediction using the obtained first motion vector; and
   obtains a second motion vector by performing motion estimation on the enhancement layer image within a 1-pixel range in both a horizontal direction and a vertical direction from an integer pixel position co-located with an integer pixel position shown by an integer portion of the first motion vector used to code the base image, and codes the enhancement lay image by performing motion prediction using the obtained second motion vector.

8. The image coding apparatus according to claim 1, wherein said MVC encoder:
   obtains a first motion vector by performing motion estimation on a motion estimation range in the base layer image, codes the base layer image by performing motion prediction using the obtained first motion vector, quantizes the obtained first motion vector, and inversely quantizes the quantized first motion vector; and
   obtains a second motion vector by performing motion estimation on the enhancement layer image within a range that includes a pixel position shown by the inversely quantized first motion vector and is smaller than the motion estimation range in the base layer image, and codes the enhancement layer image by performing motion prediction using the obtained second motion vector.

9. The image coding apparatus according to claim 1, wherein said MVC encoder codes the enhancement layer image by using inter-view prediction that assumes that a magnitude of a displacement vector to be used for inter-view prediction is 0.

10. The image coding apparatus according to claim 1, wherein said MVC encoder obtains a displacement vector to be used for inter-view prediction by performing displacement estimation within a 1-pixel range in both a horizontal direction and a vertical direction, and codes the enhancement layer image by using inter-view prediction.

11. An image decoding apparatus which decodes a current image to be decoded which is included in a bitstream and has a bit depth greater than a predetermined bit depth, the bit depth indicating information capacity per pixel, said image decoding apparatus comprising:
   an MIX (multiview video coding) decoder which (i) is a decoder for decoding a multiview video including a base view image of a base view and a non-base view image of a non-base view different from the base view, and (ii) decodes, as the base view image, a base layer image having a bit depth equal to or less than the predetermined bit depth and decodes, as the non-base view image, an enhancement layer image having a bit depth equal to or less than the predetermined hit depth, the base layer image and the enhancement layer image being included in the bitstream, and the enhancement layer image being an image for increasing the bit depth of the base layer image; and
   an adder which synthesizes each of pixel values of the base layer image decoded as the base view image and a corresponding one of pixel values of the enhancement layer image decoded as the non-base view image into the current image having the bit depth greater than the predetermined hit depth.

12. The image decoding apparatus according to claim 11, wherein said adder generates the current image by shifting up each of the pixel values of the base layer image such that the base layer image and the current image have the same bit depth and adding each of the pixel values of the enhancement layer image to the corresponding one of the shifted-up pixel values of the base layer image.

13. The image decoding apparatus according to claim 11, wherein said adder generates the current image by multiplying each of the pixel values of the base layer image by a predetermined multiplier such that the base layer image and the current image have the same bit depth and adding each of the pixel values of the enhancement layer image to the corresponding one of the post-multiplication pixel values of the base layer image.

14. The image decoding apparatus according to claim 12, wherein said adder generates the current image by subtracting a predetermined value added in coding, from each of values obtained by adding the pixel values of the enhancement layer image to the corresponding post-multiplication pixel values of the base layer image.

15. The image decoding apparatus according to claim 12, wherein said adder generates the current image by subtracting a value obtained by rounding, to an integer, a half of a maximum pixel value represented by the bit depth of the enhancement layer image from each of values obtained by adding the pixel values of the view enhancement layer image to the corresponding post-multiplication pixel values of the base layer image.

16. The image decoding apparatus according to claim 15, wherein said adder generates the current image by adjusting a value smaller than a predetermined minimum value among the values obtained by subtracting the half of the maximum pixel value to the predetermined minimum value and adjusting a value greater than a predetermined maximum value among the values obtained by subtracting the half of the maximum pixel value to the predetermined maximum value.

17. An image coding method of coding a current image to be coded having a hit depth greater than a predetermined bit depth, the bit depth indicating information capacity per pixel, said image coding method comprising:
   down-converting the current image into a base layer image having a bit depth equal to or less than the predetermined bit depth;
   coding the base layer image as the base view image and decoding the base layer image coded as the base view image to generate a reconstructed image, using an MVC (multiview video coding) encoder which is an encoder for coding a multiview video including a base view image of a base view and a non-base view image of a non-base view different from the base view;
   calculating differences between characteristics of pixel values of the pre-down-conversion current image and characteristics of corresponding pixel values of the reconstructed image, and generating, using the calculated differences, an enhancement layer image having a bit depth equal to or less than the predetermined bit depth, the enhancement layer image being an image for increasing the bit depth of the base layer image; and
   coding the enhancement layer image as the non-base view image, using the MVC encoder.

18. An image decoding method of decoding a current image to be decoded which is included in a bitstream and has a bit depth greater than a predetermined bit depth, the bit depth indicating information capacity per pixel, said image decoding method comprising:

decoding, as a base view image, a base layer image having a bit depth equal to or less than the predetermined bit depth and decoding, as a non-base view image, an enhancement layer image having a bit depth equal to or less than the predetermined bit depth, using an MVC (multiview video coding) decoder which is a decoder for decoding a multiview video including the base view image of a base view and a non-base view image of a non-base view different from the base view, the base layer image and the enhancement layer image being included in the bitstream, and the enhancement layer image being an image for increasing the bit depth of the base layer image; and synthesizing each of pixel values of the base layer image decoded as the base view image and a corresponding one of pixel values of the enhancement layer image decoded as the non-base view image into the current image having the bit depth greater than the predetermined bit depth.

19. An integrated circuit which codes a current image to be coded having a bit depth greater than a predetermined bit depth, the bit depth indicating information capacity per pixel, said integrated circuit comprising:

a down-converter which down-converts the current image into a base layer image having a bit depth equal to or less than the predetermined bit depth;

an MVC (multiview video coding) encoder which (i) is an encoder for coding a multiview video including a base view image of a base view and a non-base view image of a non-base view different from the base view, and (ii) codes the base layer image as the base view image and decodes the base layer image coded as the base view image to generate a reconstructed image; and a subtracter which calculates differences between characteristics of pixel values of the pre-down-conversion current image and characteristics of corresponding pixel values of the reconstructed image, and generates, using the calculated differences, an enhancement layer image having a bit depth equal to or less than the predetermined bit depth, the enhancement layer image being an image for increasing the bit depth of a base layer image, wherein said MVC encoder further codes the enhancement layer image as the non-base view image.

20. An integrated circuit which decodes a current image to be decoded which is included in a bitstream and has a bit depth greater than a predetermined bit depth, the bit depth indicating information capacity per pixel, said integrated circuit comprising:

an MVC (multiview video coding) decoder which (i) is a decoder for decoding a multiview video including a base view image of a base view and a non-base view image of a non-base view different from the base view, and (ii) decodes, as the base view image, a base layer image having a hit depth equal to or less than the predetermined bit depth and decodes, as the non-base view image, an enhancement layer image having a bit depth equal to or less than the predetermined bit depth, the base layer image and the enhancement layer image being included in the bitstream, and the enhancement layer image being an image for increasing the bit depth of the base layer image; and an adder which synthesizes each of pixel values of the base layer image decoded as the base view image and a corresponding one of pixel values of the enhancement layer image decoded as the non-base view image into the current image having the bit depth greater than the predetermined bit depth.

21. A non-transitory computer-readable recording medium for use in a computer, said recording medium having a computer program recorded thereon for causing the computer to execute coding a current image to be coded having a bit depth greater than a predetermined bit depth, the bit depth indicating information capacity per pixel, the coding which includes:

down-converting the current image into a base layer image having a bit depth equal to or less than the predetermined bit depth;

coding the base layer image as the base view image and decoding the base layer image coded as the base view image to generate a reconstructed image, using an MVC (multiview video coding) encoder which is an encoder for coding a multiview video including a base view image of a base view and a non-base view image of a non-base view different from the base view;

calculating differences between characteristics of pixel values of the pre-down-conversion current image and characteristics of corresponding pixel values of the reconstructed image, and generating, using the calculated differences, an enhancement layer image having a bit depth equal to or less than the predetermined bit depth, enhancement layer image being an image for increasing the bit depth of the base layer image; and coding the enhancement layer as the non-base view image, using the MVC encoder.

22. A non-transitory computer-readable recording medium for use in a computer, said recording medium having a computer program recorded thereon for causing the computer to execute decoding a current image to be decoded which is included in a bitstream and has a bit depth greater than a predetermined bit depth, the bit depth indicating information capacity per pixel, the decoding which includes:

decoding, as a base view image, a base layer image having a bit depth equal to or less than the predetermined bit depth and decoding, as a non-base view image, an enhancement layer image having a hit depth equal to or less than the predetermined bit depth, using an MVC (multiview video coding) decoder which is a decoder for decoding a multiview video including the base view image of a base view and a non-base view image of a non-base view different from the base view, the base layer image and the enhancement layer image being included in the bitstream, and the enhancement layer image being an image for increasing the bit depth of the base layer image; and synthesizing each of pixel values of the base layer image decoded as the base view image and a corresponding one of pixel values of the enhancement layer image decoded as the non-base view image into the current image having the bit depth greater than the predetermined bit depth.

\* \* \* \* \*